US012811442B2

(12) United States Patent
Ryan et al.

(10) Patent No.: US 12,811,442 B2
(45) Date of Patent: Nov. 24, 2026

(54) COMMUNICATION METHOD FOR WIRELESS POWER TRANSFER SYSTEM

(71) Applicant: Solace Power Inc., Mount Pearl (CA)

(72) Inventors: Bernard Ryan, Mount Pearl (CA); Amir Tahavorgar, Mount Pearl (CA)

(73) Assignee: SOLACE POWER INC., Mount Pearl (CA)

( * ) Notice: Subject to any disclaimer, the term of this patent is extended or adjusted under 35 U.S.C. 154(b) by 0 days.

(21) Appl. No.: 18/392,900

(22) Filed: Dec. 21, 2023

(65) Prior Publication Data

US 2024/0213818 A1 Jun. 27, 2024

Related U.S. Application Data

(60) Provisional application No. 63/434,543, filed on Dec. 22, 2022.

(51) Int. Cl.
*H02J 50/80* (2016.01)
*H02J 50/12* (2016.01)
*H02M 3/158* (2006.01)

(52) U.S. Cl.
CPC .............. *H02J 50/80* (2016.02); *H02J 50/12* (2016.02); *H02M 3/1588* (2013.01)

(58) Field of Classification Search
CPC ......... H02J 50/80; H02J 50/12; H02M 3/1588
USPC .......................................................... 307/104
See application file for complete search history.

(56) References Cited

U.S. PATENT DOCUMENTS 9,653,948 B2 5/2017 Polu et al.
9,979,206 B2 5/2018 Nyberg et al.
10,122,217 B2 * 11/2018 Hrinya .................... H02J 50/12
10,819,245 B1 * 10/2020 Iorio ................ H02M 3/33592
2015/0215006 A1 7/2015 Mehas et al.
2016/0294445 A1 10/2016 Norconk et al.
2017/0093218 A1 * 3/2017 Hrinya .................... H02J 50/12
2021/0281112 A1 * 9/2021 Danilovic ............... H02J 50/12
2021/0367456 A1 * 11/2021 Toula ..................... H02H 9/043
2021/0384722 A1 * 12/2021 Mehas ..................... H02H 9/04
2022/0085653 A1 3/2022 Rouse et al.
2022/0360117 A1 11/2022 Stingu et al.
2023/0099911 A1 * 3/2023 Cheong ................ H02M 7/219 320/108

OTHER PUBLICATIONS

International Search Report and Written Opinion for PCT/CA2023/051724 mailed Mar. 6, 2024.
Supplementary European Search Report dated Apr. 1, 2026 for European Application 2390494.7.

* cited by examiner

*Primary Examiner* — Alfonso Perez Borroto
(74) *Attorney, Agent, or Firm* — Harness, Dickey & Pierce, P.L.C.

(57) ABSTRACT

There is provided a method of communicating between a receiver of a wireless power transfer system and a transmitter of the wireless power transfer system. The receiver comprises a synchronous rectifier. The method comprises modifying operation of a synchronous rectifier of a receiver of a wireless power transfer system. The method further comprises detecting a parameter change at a transmitter of the wireless power transfer system based on a modification of the operation of the synchronous rectifier. The method further comprises determining data communicated from the receiver to the transmitter based on the parameter change.

20 Claims, 17 Drawing Sheets

COMMUNICATION METHOD FOR WIRELESS POWER TRANSFER SYSTEM

CROSS-REFERENCE TO RELATED APPLICATIONS

This application claims the benefit of U.S. Provisional Application No. 63/434,543 filed on 22 Dec. 2022, and titled COMMUNICATION METHOD FOR WIRELESS POWER TRANSFER SYSTEM, the entirety of which is incorporated herein by reference.

TECHNICAL FIELD

The present disclosure relates generally to wireless power transfer, and in particular, to a method and controller of communicating between a receiver and a transmitter of a wireless power transfer system, the receiver comprising a synchronous rectifier.

BACKGROUND

Wireless power transfer systems such as wireless charging are becoming an increasingly important technology to enable the next generation of devices. The potential benefits and advantages offered by the technology is evident by the increasing number of manufacturers and companies investing in the technology.

A variety of wireless power transfer systems are known. A typical wireless power transfer system includes a power source electrically connected to a wireless power transmitter, and a wireless power receiver electrically connected to a load.

In magnetic induction systems, the transmitter has a transmitter coil with a certain inductance that transfers electrical energy from the power source to the receiver, which has a receiver coil with a certain inductance. Power transfer occurs due to coupling of magnetic fields between the coils or inductors of the transmitter and receiver. The range of these magnetic induction systems is limited, and the coils or inductors of the transmitter and receiver must be tightly coupled, i.e. have a coupling factor above 0.5 and be in optimal alignment for efficient power transfer.

There also exist resonant magnetic systems in which power is transferred due to coupling of magnetic fields between the coils or inductors of the transmitter and receiver. The transmitter and receiver inductors may be loosely coupled, i.e. have a coupling factor below 0.5. However, in resonant magnetic systems the inductors are resonated using at least one capacitor. Furthermore, in resonant magnetic systems, the transmitter is self-resonant and the receiver is self-resonant. The range of power transfer in resonant magnetic systems is increased over that of magnetic induction systems and alignment issues are rectified. While electromagnetic energy is produced in magnetic induction and resonant magnetic systems, the majority of power transfer occurs via the magnetic field. Little, if any, power is transferred via electric induction or resonant electric induction.

In electrical capacitive systems, the transmitter and receiver have capacitive electrodes. Power transfer occurs due to coupling of electric fields between the capacitive electrodes of the transmitter and receiver. Similar, to resonant magnetic systems, there exist resonant electric systems in which the capacitive electrodes of the transmitter and receiver are made resonant using at least one inductor. The inductor may be a coil. In resonant electric systems, the transmitter is self-resonant and the receiver is self-resonant. Resonant electric systems have an increased range of power transfer compared to that of electric induction systems and alignment issues are rectified. While electromagnetic energy is produced in electric induction and resonant electric systems, the majority of power transfer occurs via the electric field. Little, if any, power is transferred via magnetic induction or resonant magnetic induction.

While some wireless power transfer systems are known, improvements are desired. For example, in a wireless power transfer system it may be desirable to send data from a receiver of the system to a transmitter. In general, the data is transferred from the receiver to the transmitter so the source of power in the system, i.e., the transmitter, receives relevant data from the receiver. This can occur before initialization of the wireless power transfer system to, for example, detect an appropriate receiver to send power to. For example, the transmitter may receive a rectified voltage at the receiver in order to adjust the DC voltage of an inverter of the transmitter during an initialization of the wireless power transfer system. Alternatively or additionally, data may be transmitted during the operation of the wireless power transfer system to send relevant data, e.g., DC voltages, currents, temperatures, and battery charge, regarding the operating condition of the receiver. The data may then be used by the transmitter for decision making in terms of authentication, protection, and operation of the system. Additionally, customer data may be transferred from receiver to the transmitter where it may then be transmitted to an end-user using a commonly used communication method such as Wi-Fi, Ethernet, Bluetooth, or USB.

While some communication methods in wireless power systems are known, improvements and/or alternatives are desired. It is therefore an object to provide a novel method, apparatus, system, apparatus, device and/or non-transitory computer-readable medium for communicating from a receiver to a transmitter of a wireless power transfer system.

This background serves only to set a scene to allow a person skilled in the art to better appreciate the following description. Therefore, none of the above discussion should necessarily be taken as an acknowledgement that that discussion is part of the state of the art or is common general knowledge. One or more aspects/embodiments of the disclosure may or may not address one or more of the background issues.

SUMMARY

According to an aspect of the disclosure there is provided methods and controllers for communicating between a receiver and a transmitter of a wireless power transfer system. Such methods and controllers may have reduced power dissipation and therefore increased efficiency when compared with existing communication methods. Such methods and systems may have an increased symbol or data rate, i.e., speed of transmission, of data communicated between the receiver and transmitter compared with existing communication methods. Such methods and controllers may have an increased bandwidth compared with existing communication methods.

Accordingly, in an aspect there is provided a method of communicating between a receiver of a wireless power transfer system and a transmitter of the wireless power transfer system, the receiver comprising a synchronous rectifier.

The wireless power transfer system may be a high frequency wireless power system such as described in applicant's U.S. Provisional application Ser. No. 17/018,328, a resonant capacitively coupled wireless power transfer system as described in applicant's own U.S. Pat. No. 9,653,948B2, or a bidirectional wireless power transfer system as described in applicant's own U.S. patent application Ser. No. 17/899,711, the relevant portions of which are incorporated herein.

The method may comprise:

modifying operation of a synchronous rectifier of a receiver of a wireless power transfer system;

detecting a parameter change at a transmitter of the wireless power transfer system based on a modification of the operation of the synchronous rectifier; and determining data communicated from the receiver to the transmitter based on the parameter change.

Modifying operation of the synchronous rectifier may result in a detectable parameter change at the transmitter. Detection of this change in the parameter at the transmitter may be used to determine data communicated from the receiver to the transmitter. Communicating data from the receiver to the transmitter based on modifying operation of the synchronous rectifier may be more power efficient and allow for greater throughput than conventional communication methods.

Modifying operation of the synchronous rectifier may comprise:

toggling the synchronous rectifier between synchronous operation and non-synchronous operation.

Modifying operation of the synchronous rectifier may comprise:

selectively enabling and disabling the synchronous rectifier.

Selectively enabling and disabling the synchronous rectifier may comprises enabling and disabling synchronous operation of the synchronous rectifier. Modifying operation of the synchronous rectifier may comprise toggling operation of the synchronous operation. The time between selectively enabling/disabling or toggling operation may be altered to communicate data from the receiver to the transmitter.

Selectively enabling and disabling the synchronous rectifier may comprise selectively enabling and disabling a portion of the synchronous rectifier. Further, selectively enabling and disabling the synchronous rectifier may comprise enabling and/or disabling one side of synchronous rectifier in a push-pull configuration.

The synchronous rectifier may comprise a two-phase system, or have a push-pull configuration. One side (or phase) of the synchronous rectifier can be synchronous while the other side may be non-synchronous.

Selectively enabling and disabling the synchronous rectifier may comprise selectively enabling and disabling one side (or phase) of the synchronous rectifier.

The synchronous rectifier may comprise at least one field effect transistor (FET).

The synchronous rectifier may comprise at least one of the following:

a rectifier element for rectifying a power signal to direct current (DC);

a trigger circuit; and a gate driver electrically connected to the trigger circuit and the rectifier element.

The gate driver may be for controlling operation of the rectifier element via a trigger signal output by the trigger circuit. The gate driver may output a gate drive voltage or gate signal which is in phase with an input voltage received at the rectifier element.

The trigger circuit may ensure proper timing of a gate drive voltage or gate signal output by the gate driver.

The rectifier element may comprise an amplifier. The rectifier element may comprise a FET. The rectifier element may comprise a load-independent class E rectifier. The class E rectifier design may be adapted for converting an input radio frequency (RF) power signal to DC. The operating or switching frequencies of the rectifier element may be, for example, 13.56 MHz and 27.12 MHz.

The gate driver may output a gate drive voltage or gate signal to control operation of the rectifier element. Specifically, the gate signal may control operation of the amplifier by controlling operation of the FET.

The trigger circuit may comprise:

a sampling circuit for sampling the input signal.

The sampling circuit may be a voltage divider.

The trigger circuit may comprise:

a delay line for delaying output of the sampling circuit such that a gate signal is synchronized with the input signal received at the drain element.

The trigger circuit may comprise:

a comparator for generating a clock signal by comparing a delayed signal output by the delay line to a DC voltage level.

The trigger circuit may comprise:

a RC delay circuit for delaying output of the sampling circuit such that the gate signal is synchronized with the input signal received at the drain element.

The RC delay circuit may comprise at least one resistor electrically connected to at least one capacitor.

The trigger circuit may comprise:

a comparator for generating a clock signal by comparing a delayed signal output by the RC delay circuit to a DC voltage level.

The synchronous rectifier may further comprise an auxiliary DC/DC converter for powering at least one of the trigger circuit and gate driver. In other words, the synchronous rectifier may comprise a power source for powering at least one of the trigger circuit and the gate driver. The power source may be powered by power received at the receiver, e.g., power received from the transmitter via wireless power transfer.

The auxiliary DC/DC converter may be electrically connected to a low-dropout (LDO) regulator.

Modifying operation of the synchronous rectifier may comprise:

controlling operation of at least one of the trigger circuits, gate drivers and auxiliary DC/DC converters. Modifying operation of the synchronous rectifier may comprise controlling operation of all of the trigger circuit, gate drive and auxiliary DC/DC converter.

Controlling operation of the trigger circuit may comprise:

controlling operation of a comparator of the trigger circuit. Controlling operation of the comparator may comprise selectively enabling and disabling the comparator. The comparator may comprise a comparator circuit. The comparator may comprise an enable pin. Controlling operation of the trigger circuit may comprise selectively enabling the compactor via the enable pin.

Controlling operation of the auxiliary DC/DC converter may comprise:

selectively enabling and disabling operation of the auxiliary DC/DC converter to selectively power the trigger circuit and the gate driver. Selectively enabling/disabling the auxiliary DC/DC converter may comprise controlling power supplied to the auxiliary DC/DC converter. The auxiliary DC/DC converter may comprise an enable pin. Selectively enabling the auxiliary DC/DC converter may comprise selectively enabling the auxiliary DC/DC converter via the enable pin.

Detecting the parameter change may comprise:

detecting a voltage or current waveform at the transmitter. The voltage or current waveform may be detected at certain nodes of the transmitter. The voltage waveform may be detected at an output stage of the transmitter. The current waveform may be detected at an input of an inverter of the transmitter.

Determining data communicated may comprise:

processing the detected voltage or current waveform to determine communicated data.

Processing the detected voltage or current waveform may comprise:

filtering the voltage or current waveform;

generating logic levels based on the filtered voltage or current waveform; and decoding data based on the generated logic levels.

The logic levels may reflect variations in the voltage or current waveforms. For example, a change from a high voltage to a low voltage may represent a data transfer of 1 to 0, and a change from a low voltage to a high voltage may represent a data transfer of 0 to 1.

Decoding data comprises:

determining time intervals between the logic levels; and decoding data based on the time intervals.

In another aspect there is provided a method of communicating between a receiver of a wireless power transfer system and a transmitter of the wireless power transfer system, the receiver comprising a synchronous rectifier, the method performed by the receiver.

The method performed by the receiver may comprise:

modifying operation of the synchronous rectifier of the receiver of the wireless power transfer system based on input data to change a parameter at the transmitter.

Modifying operation of the synchronous rectifier may comprise:

toggling the synchronous rectifier between synchronous operation and non-synchronous operation.

Modifying operation of the synchronous rectifier may result in a detectable parameter change at the transmitter. Detection of this change in the parameter at the transmitter may be used to determine data communicated from the receiver to the transmitter. Communicating data from the receiver to the transmitter based on modifying operation of the synchronous rectifier may be more power efficient and allow for greater throughput than conventional communication methods.

Modifying operation of the synchronous rectifier may comprise:

selectively enabling and disabling the synchronous rectifier.

Selectively enabling and disabling the synchronous rectifier may comprises enabling and disabling synchronous operation of the synchronous rectifier. Modifying operation of the synchronous rectifier may comprise toggling operation of the synchronous operation. The time between selectively enabling/disabling or toggling operation may be altered to communicate data from the receiver to the transmitter.

The synchronous rectifier may comprise at least one field effect transistor (FET).

The synchronous rectifier may comprise at least one of the following:

a rectifier element for rectifying a power signal to direct current (DC);

a trigger circuit; and a gate driver electrically connected to the trigger circuit and the rectifier element.

The gate driver may be for controlling operation of the rectifier element via a trigger signal output by the trigger circuit. The gate driver may output a gate drive voltage or gate signal which is in phase with an input voltage received at the rectifier element.

The trigger circuit may ensure proper timing of a gate drive voltage or gate signal output by the gate driver.

The rectifier element may comprise an amplifier. The rectifier element may comprise a FET. The rectifier element may comprise a load-independent class E rectifier. The class E rectifier design may be adapted for converting an input radio frequency (RF) power signal to DC. The operating or switching frequencies of the rectifier element may be, for example, 13.56 MHz and 27.12 MHz.

The gate driver may output a gate drive voltage or gate signal may control operation of the rectifier element. Specifically, the gate signal may control operation of the amplifier by controlling operation of the FET.

The trigger circuit may comprise:

a sampling circuit for sampling the input signal.

The sampling circuit may be a voltage divider.

The trigger circuit may comprise:

a delay line for delaying output of the sampling circuit such that a gate signal is synchronized with the input signal received at the drain element.

The trigger circuit may comprise:

a comparator for generating a clock signal by comparing a delayed signal output by the delay line to a DC voltage level.

The trigger circuit may comprise:

a RC delay circuit for delaying output of the sampling circuit such that the gate signal is synchronized with the input signal received at the drain element.

The RC delay circuit may comprise at least one resistor electrically connected to at least one capacitor.

The trigger circuit may comprise:

a comparator for generating a clock signal by comparing a delayed signal output by the RC delay circuit to a DC voltage level.

The synchronous rectifier may further comprise an auxiliary DC/DC converter for powering at least one of the trigger circuit and gate driver. In other words, the synchronous rectifier may comprise a power source for powering at least one of the trigger circuit and the gate driver. The power source may be powered by power received at the receiver, e.g., power received from the transmitter via wireless power transfer.

The auxiliary DC/DC converter may be electrically connected to a LDO regulator.

Modifying operation of the synchronous rectifier may comprise:

controlling operation of at least one of the trigger circuit, gate driver and auxiliary DC/DC converter. Modifying operation of the synchronous rectifier may comprise controlling operation of all of the trigger circuit, gate drive and auxiliary DC/DC converter. Each of the trigger circuit, gate driver and auxiliary DC/DC converter may comprise an enable pin. Controlling operation of at least one of the trigger circuit, gate driver and auxiliary DC/DC converter may comprise controlling operation of at least one of the trigger circuit, gate driver and auxiliary DC/DC converter via their respective enable pins.

Controlling operation of the trigger circuit may comprise:

controlling operation of a comparator of the trigger circuit. Controlling operation of the comparator may comprise selectively enabling power to the comparator. The comparator may comprise a comparator circuit.

Controlling operation of the auxiliary DC/DC converter may comprise:

selectively enabling and disabling operation of the auxiliary DC/DC converter to selectively power at least one of the trigger circuit and the gate driver. Selectively enabling/disabling the auxiliary DC/DC converter may comprise controlling power supplied to the auxiliary DC/DC converter.

According to another aspect there is provided a controller for communicating a signal between a receiver of a wireless power transfer system and a transmitter of the wireless power transfer system, the receiver comprising a synchronous rectifier.

The controller may be adapted to modify operation of the synchronous rectifier to alter a parameter detectable at the transmitter.

The controller may be adapted to toggle the synchronous rectifier between synchronous operation and non-synchronous operation.

The controller may be adapted to selectively enable and disable the synchronous rectifier.

Selectively enabling and disabling the synchronous rectifier may comprise enabling and disabling synchronous operation of the synchronous rectifier. Modifying operation of the synchronous rectifier may comprise toggling operation of the synchronous operation. The time between selectively enabling/disabling or toggling operation may be altered to communicate data from the receiver to the transmitter.

The controller may be electrically connected to the synchronous rectifier.

The controller may be electrically connected to at least one of:

a trigger circuit of the synchronous rectifier; and a gate driver of the synchronous rectifier, the gate driver electrically connected to the trigger circuit and a rectifier element of the synchronous rectifier.

The controller may be adapted to control operation of a comparator of the trigger circuit. Controlling operation of the comparator may comprise selectively enabling power to the comparator. The comparator may comprise a comparator circuit.

The controller may be electrically connected to:

an auxiliary DC/DC converter of the synchronous rectifier, the auxiliary DC/DC converter for powering at least one of the trigger circuit and gate driver.

The controller may be adapted to selectively enable and disable operation of the auxiliary DC/DC converter to selectively power at least one of the trigger circuit and the gate driver. Selectively enabling/disabling the auxiliary DC/DC converter may comprise controlling power supplied to the auxiliary DC/DC converter.

The controller may further comprise a power source for supplying power to the controller. The power source may supply power to at least one of the trigger circuit and the gate driver. The power source may be powered by power received at the receiver, e.g., power received from the transmitter via wireless power transfer.

The power source may comprise an auxiliary DC/DC converter.

The controller may be supplied power by a LDO regulator.

According to another aspect there is provided a method of communicating between a receiver of a wireless power transfer system and a transmitter of the wireless power transfer system, the receiver comprising a synchronous rectifier, the method performed by the transmitter.

The method performed by the transmitter may comprise:

detecting a parameter change at the transmitter based on a modification to the operation of the synchronous rectifier of the receiver.

The method may further comprise:

determining data communicated from the receiver to the transmitter based on the parameter change.

The modification of the operation of the synchronous rectifier at the receiver may result in a parameter change at the transmitter which is detectable. Based upon changes to this parameter, data may be determined to communicate data from the receiver to the transmitter.

The detecting the parameter change may comprise:

detecting a voltage or current waveform at the transmitter.

Determining data communicated may comprise:

processing the detected voltage or current waveform to determine communicated data.

Processing the detected voltage or current waveform may comprise:

filtering the voltage or current waveform;

generating logic levels based on the filtered voltage or current waveform; and decoding data based on the generated logic levels.

Decoding data may comprise:

determining time intervals between the logic levels; and decoding data based on the time intervals.

According to another aspect there is provided a controller for communicating a signal between a receiver of a wireless power transfer system and a transmitter of the wireless power transfer system, the receiver comprising a synchronous rectifier.

The controller may be adapted to detect a parameter change at the transmitter based on a modification to the operation of the synchronous rectifier of the receiver.

The controller may be further adapted to determine data communicated from the receiver to the transmitter based on the parameter change.

The controller may further comprise:

a detector for detecting a voltage and/or current waveform at the transmitter.

The detector may further comprise:

a demodulator adapted to demodulate a voltage and/or current waveform at the transmitter.

The detector may comprise:

a filter adapted to filter the demodulated voltage and/or current.

The detector may be adapted to:

generate logic levels based on the filtered voltage and/or current; and decode data based on the generated logic levels.

The detector may be adapted to:

determine time intervals between the logic levels; and decode data based on the time intervals.

The controller may further comprise a power source for supplying power to the controller.

The power source may comprise an auxiliary DC/DC converter.

The controller may be supplied power by a LDO regulator.

The controller may further comprise:

a scaling unit for reduce the amplitude of the detected voltage or current waveform. Reducing the amplitude of the waveform my simplify processing of the waveform.

The controller may further comprise:

a peak detector for detecting peaks in the detected voltage or current waveform.

The controller may further comprise:

a signal conditioner.

The signal conditioner may be adapted to amplify the detected voltage or current waveform.

The signal conditioner may be adapted to compare the detected voltage or current waveform against a reference level, e.g., a reference voltage or current level. The signal conditioner may be adapted to output a logic level signal, e.g., 0 or 1, based on the comparison.

The signal conditioner may comprise a comparator. The comparator may be adapted to perform the described comparison.

The controller may further comprise:

an encoder for receiving data and encoding the data into a time sequence. Thus, data to be transmitted from the receiver to the transmitter may be encoded into a time sequence of synchronous and non-synchronous operation of the synchronous rectifier. The data may be binary data.

The synchronous rectifier may be toggled between synchronous and non-synchronous operation based on the time sequence encoded by the encoder. Toggling of the synchronous rectifier according to the time sequence may result in a detectable parameter change at the transmitter which may be demodulated or decoded into the data thereby communicating data from the receiver to the transmitter.

The described features and/or aspects of the controller may be implemented in one or more microcontrollers (MCU). For example, the detector may be implemented in a microcontroller at the transmitter. Additionally or alternatively, the encoder may be implemented in a separate and distinct microcontroller at the receiver.

A microcontroller at the receiver may be adapted to encode received data, e.g., binary data, into a time sequence. The microcontroller may be further adapted to toggle a synchronous rectifier at the receiver between synchronous and non-synchronous operation based on a time sequence, e.g., the time sequence encoded based on the received data.

A microcontroller at the transmitter may be adapted to receive detected parameter changes, e.g., parameter changes detected at the transmitter. The parameter changes may be a voltage and/or current waveform varying over time. The microcontroller may be adapted to demodulate the parameter changes into separate logic levels. The microcontroller may be adapted to convert the logic levels into data based on time between logic levels. The data may be binary data.

According to another aspect there is provided a computer-readable medium comprising instructions that, when executed by a processor, perform any of the described methods.

The computer-readable medium may be non-transitory. The computer-readable medium may comprise storage media excluding propagating signals. The computer-readable medium may comprise any suitable memory or storage device such as random-access memory (RAM), static RAM (SRAM), dynamic RAM (DRAM), non-volatile RAM (NVRAM), read-only memory (ROM), or Flash memory.

The processor may have a single-core processor or multiple core processors composed of a variety of materials, such as silicon, polysilicon, high-K dielectric, copper, and so on.

According to another aspect there is provided a computer program comprising instructions that, when executed by a processor, perform any of the described methods.

The invention includes one or more corresponding aspects, embodiments or features in isolation or in various combinations whether or not specifically stated (including claimed) in that combination or in isolation. As will be appreciated, features associated with particular recited embodiments relating to systems may be equally appropriate as features of embodiments relating specifically to methods of operation or use, and vice versa.

The above summary is intended to be merely exemplary and non-limiting.

BRIEF DESCRIPTION OF THE DRAWINGS

These and other aspects of the present disclosure will now be described, by way of example only, with reference to the accompanying Figures, in which.

DETAILED DESCRIPTION OF THE DRAWINGS

Figure 1:
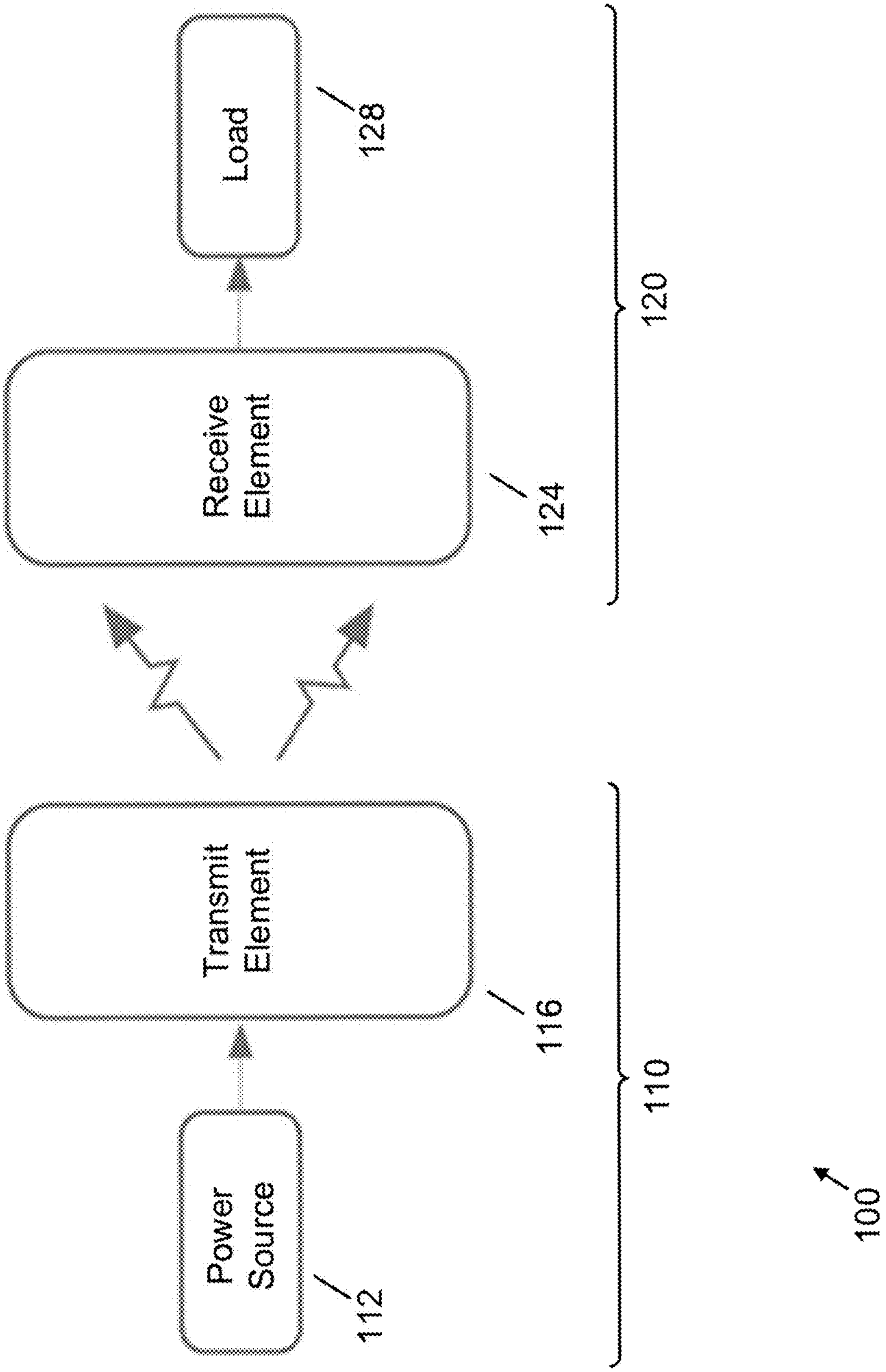
FIG. 1 is a block diagram of a wireless power transfer system.

The foregoing summary, as well as the following detailed description of certain embodiments will be better understood when read in conjunction with the accompanying drawings.

As will be appreciated, like reference characters are used to refer to like elements throughout the description and drawings. As used herein, an element or feature recited in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising", "having" or "including" an element or feature or a plurality of elements or features having a particular property might further include additional elements or features not having that particular property. Also, it will be appreciated that the terms "comprises", "has" and "includes" mean "including but not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to".

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, or within less than 0.01% of the stated amount.

Turning now to FIG. 1, a wireless power transfer system generally identified by reference numeral 100 is shown. The wireless power transfer system 100 comprises a transmitter 110 comprising a power source 112 electrically connected to a transmit element 116, and a receiver 120 comprising a receive element 124 electrically connected to a load 128. Power is transferred from the power source 112 to the transmit element 116. The power is then transferred from the transmit element 116 to the receive element 124 via resonant or non-resonant electric or magnetic field coupling. The power is then transferred from the receive element 124 to the load 128. Exemplary wireless power transfer systems 100 include a high frequency inductive wireless power transfer system as described in applicant's U.S. Provisional Application No. 62/899,165, or a resonant capacitively coupled wireless power transfer system as described in applicant's U.S. Pat. No. 9,653,948B2, the relevant portions of which are incorporated herein.

In the wireless power transfer system 100, power is transferred from the transmit element 116 to the receive element 124. It may be desirable to be able to transfer power to and from each respective element, i.e., from receive element 124 to transmit 116.

Figure 2:
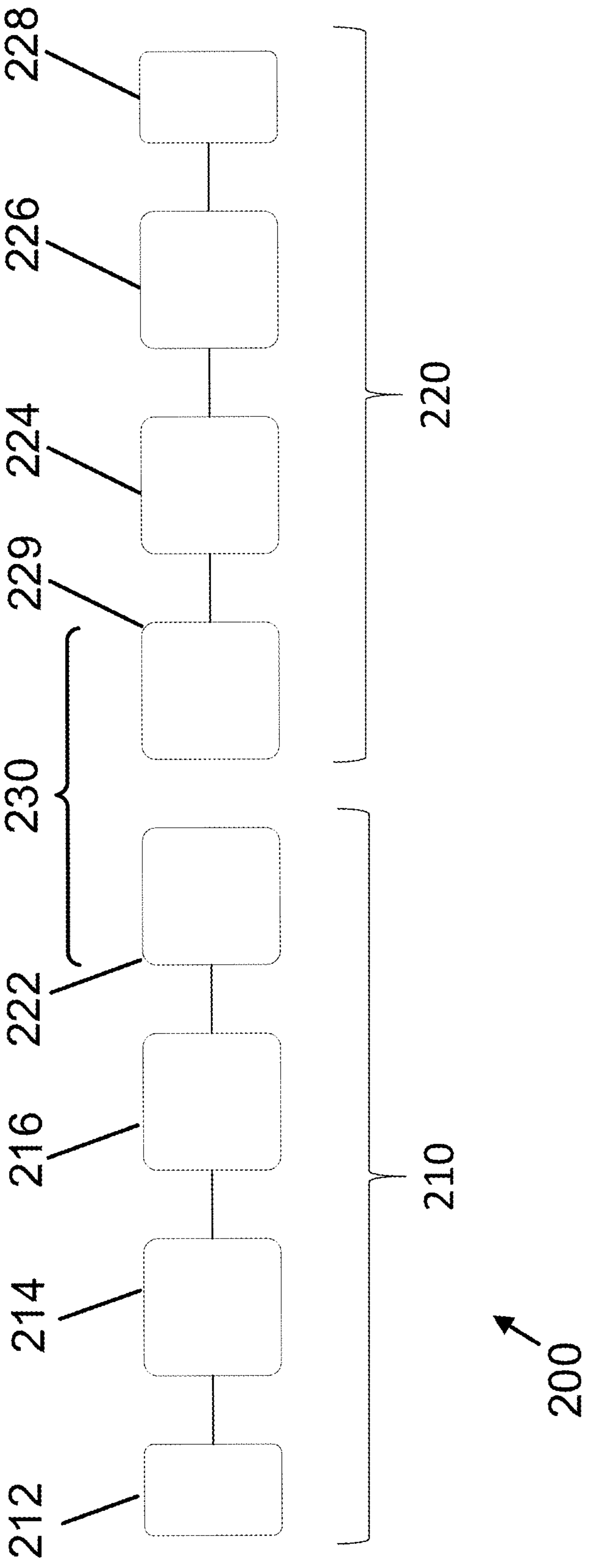
FIG. 2 is another block diagram of a wireless power transfer system.

Turning now to FIG. 2, another embodiment of a wireless power transfer system is shown generally identified as reference numeral 200.

The wireless power transfer system 200 comprises a power supply 212, DC/DC converter 214, circuitry 216, and transmit element 222. The power supply 212 are electrically connected to the DC/DC converter 214. The DC/DC converter 214 is electrically connected to circuitry 216. The circuitry 216 is electrically connected to the transmit element 222.

The power supply 212 is for generating an input power signal for transmission of power. In this embodiment, the input power signal is a direct current (DC) power signal.

The DC/DC converter 214 is for converting a received DC voltage signal to a desired voltage level. The received DC voltage may be from the power supply 212. The system 200 is illustrated as comprising the DC/DC converter 214, one of skill in the art will appreciate other configurations are possible. In another embodiment, no DC/DC converter is present.

In the illustrated arrangement, the circuitry 216 comprises an inverter and an output stage. The output stage matches the output impedance of the circuitry 216 to the optimum impedance of a wireless link 230 between the transmitter and receiver. The output stage also filters high frequency harmonic components of the inverter.

The transmit element 222 comprises one or more capacitive electrodes and inductive elements, i.e., inductors. The capacitive electrodes may be laterally spaced, elongate electrodes; however, one of skill in the art will appreciate that other configurations are possible including, but not limited to, concentric, coplanar, circular, elliptical, disc, etc., electrodes. Other suitable electrode configurations are described in applicant's U.S. Pat. No. 9,979,206B2, the relevant portions of which are incorporated herein by reference. The inductive elements may comprise one or more coils. The coils may include booster or shield coils such as described in applicant's U.S. patent application Ser. No. 17/193,539, the relevant portions of which are incorporated herein by reference.

The power source 212 supplies a DC input power signal to the DC/DC converter 214 which converts the signal to a desired voltage level. The inverter of the circuitry 216 receives the converted DC power signal and inverts the converted DC power signal to generate a magnetic and/or electric field at the transceiver element 222 to transfer power via electric or magnetic field coupling. Specifically, the transmit element 222 generates a magnetic/electric field to transfer power to the receiver via magnetic/electric field coupling. The power source 212, DC/DC converter 214, circuitry 216 and transmit element 222 may collectively form a transmitter 210. As previously stated, the DC/DC converter 214 may not be present in the transmitter 210.

The wireless power transfer system 200 further comprises load 228, DC/DC converter 226, circuitry 224, and receive element 229. The load 228 is electrically connected to the DC/DC converter 226. The DC/DC converter 226 is electrically connected to circuitry 224. The circuitry 224 is electrically connected to the receive element 229.

In the illustrated arrangement, the load 228 is a DC load. The load 228 may be static or variable.

The DC/DC converter 226 is for converting a received DC voltage signal to a desired voltage level. The received DC voltage may be from the circuitry 224. While the system 200 comprises the DC/DC converter 226, one of skill in the art will appreciate other configurations are possible. In another embodiment, no DC/DC converter 226 is present.

The circuitry 224 comprises an input stage and a synchronous rectifier. The input stage is configured to ensure optimum impedance presented to the receive element 229 at the full power state of the wireless power transfer system 200. The input stage may also preserve the quasi-voltage source behaviour of the receive element 229 so the output of the synchronous rectifier exhibits a stable DC voltage from no load to full load conditions.

The receive element 229 comprises one or more capacitive electrodes and inductive elements, i.e. inductors. The capacitive electrodes may be laterally spaced, elongate electrodes; however, one of skill in the art will appreciate that other configurations are possible including, but not limited to, concentric, coplanar, circular, elliptical, disc, etc., electrodes. Other suitable electrode configurations are described in applicant's U.S. Pat. No. 9,979,206B2, the relevant portions of which are incorporated herein by reference. The inductive elements may comprise one or more coils. The coils may include booster or shield coils such as described in applicant's U.S. patent application Ser. No. 17/193,539, the relevant portions of which are incorporated herein by reference.

The transmit and receive elements 222, 229 of the system 200 form the wireless link 230. The elements 222, 229 are separated by a wireless gap. The wireless gap may be formed by atmosphere, i.e. air, or by a physical medium, e.g., walls, glass, liquids, wood, insulations, etc. Power is transferred from one element to the other across the wireless link 230 via resonant or non-resonant magnetic and/or electric field coupling, i.e. electric or magnetic induction.

During operation, the receive element 229 extracts power from a magnetic and/or electric field generated by the transmit element 222. The circuitry 224 acts as a synchronous rectifier and rectifies the received power signal. The DC/DC converter 226 converts the rectified power signal to the desired power level which is received by the load 228. In this way, the receive element 229 extracts power transmitted by the transmit element 222 (transmitter 210) such that electrical power is transferred to the load 228 via magnetic/electric field coupling. The load 228, DC/DC converter 226, circuitry 224 and receive element 229 may collectively form a receiver 220. As previously stated, the DC/DC converter 226 may not be present in the receiver 220.

Figure 3:
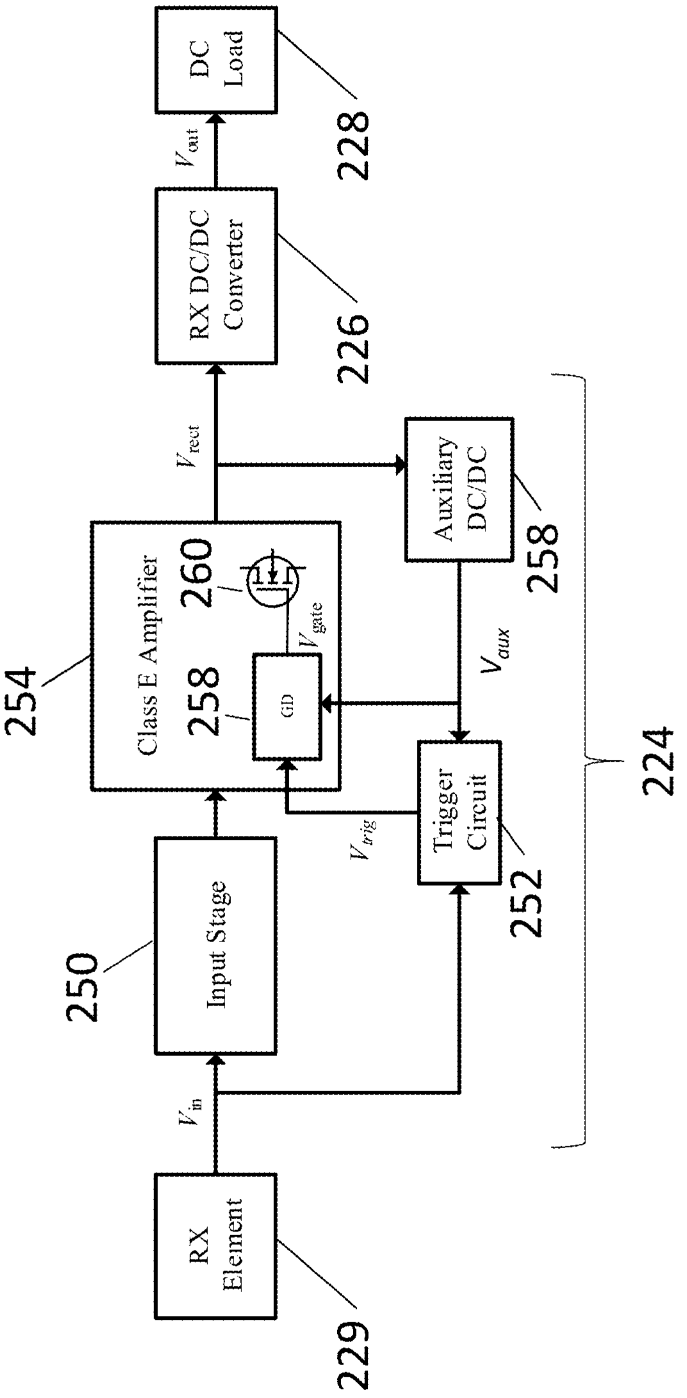
FIG. 3 is a block diagram of the receiver of the wireless power transfer system of FIG. 2.

Turning now to FIG. 3, the receiver 220 of the system 200 is shown in greater detail. As illustrated in FIG. 3, the circuitry 224 comprises an input stage 250, a trigger circuit 252, a rectifier element 254, a gate driver 256 and an auxiliary DC/DC converter 258.

The receive element 229 is electrically connected to the input stage 250 and trigger circuit 252. The receive element 229 is configured to receive power from a transmitter, e.g. transmitter 210, using resonant or non-resonant electric or magnetic field coupling. The receive element 229 may extract power from a transmitter via non-resonant or resonant magnetic or electric field coupling. As such, the receive element 229 comprises one or more receive coils (i.e. inductors) or one or more capacitive electrodes. The corresponding transmitter comprises corresponding transmit coils (i.e. inductors) or capacitive electrodes, respectively.

The receive element 229 extracts power from the transmitter and as such outputs an input voltage or signal Vin which corresponds to the extracted power or signal.

The input stage 250 is electrically connected to the rectifier element 254, receive element 229 and trigger circuit 252. The input stage 250 is adapted to perform any combination of three functions. In particular, the input stage 250 is for converting the impedance presented by the rectifier element 254 under nominal loading to the optimal load impedance for the receive element 229. The input stage 250 is for reducing harmonic content generated by the nonlinear action of the rectifier element 254 such that the receiver 220, and by extension, the wireless power system that the receiver 220 forms a part of, may meet international product requirements relating to electromagnetic compatibility (EMC). The input stage 250 is for ensuring that current input into the rectifier element 254 is approximately sinusoidal.

In this embodiment, the input stage 250 comprises a matching network or circuit. Various matching networks are possible. In this embodiment, the matching network takes the form of a double stage impedance inverter. The double stage impedance inverter is electrically connected to the receive element 229. The input stage 250 may further comprise additional filtering added in series with the rectifier element 254. The use of the double impedance inverter topology may beneficially ensure the rectifier element 254 is driven by a quasi-constant voltage source. While a double stage impedance inverter is described, one of skill in the art will appreciate the matching network may take the form of a single stage impedance inverter.

The input stage 250 is configured to ensure optimum impedance presented to the receive element 229 at the full power state of the wireless power transfer system 200. The input stage 250 may also preserve the quasi-voltage source behaviour of the receive element 229 so the output of the synchronous rectifier exhibits a stable DC voltage from no load to full load conditions.

The rectifier element 254 is electrically connected to the input stage 254, the primary DC/DC converter 226, i.e., the primary DC/DC converter and the auxiliary DC/DC converter 258.

The rectifier element 254 comprises an amplifier. The amplifier is a class E amplifier. The amplifier comprises the gate driver 258 and a main switch. The gate driver 258 drives the main switch of the amplifier. In this embodiment the main switch comprises an n-type MOSFET 260. While an n-type MOSFET 260 has been illustrated, one of skill in the art will appreciate other FETs and switching devices may be used.

The DC/DC converter 226 is electrically connected to the rectifier element 254, auxiliary DC/DC converter 258 and load 228, e.g., DC load. The primary DC/DC converter 226 is for receiving the DC power signal output from the rectifier element 254, Vrect. The DC/DC converter 226 interfaces the rectifier element 254 to the load 228. The DC/DC converter 226 is for converting the received DC power signal. The converted DC power signal is output from the DC/DC converter 226 to the load 228.

The auxiliary DC/DC converter 258 is additionally electrically connected to the primary DC/DC converter 226. The auxiliary DC/DC converter 258 is electrically connected to DC/DC converter 226, trigger circuit 252 and gate driver 258 of the rectifier element 254. The auxiliary DC/DC converter 258 is for converting the Vrect output by the rectifier element 254 to an auxiliary voltage range, e.g. in the range of 5V, Vaux, to power the trigger circuit 252 and gate driver 258. The auxiliary power voltage or signal Vaux powers the trigger circuit 252 and gate driver 258. Until the auxiliary DC/DC converter 258 can regulate, the FET 260 of the rectifier element 254 is off and the rectifier element 254 acts as a passive (diode) rectifier. In this embodiment, the auxiliary DC/DC converter 258 comprises a low-power buck converter.

The gate driver 258 is electrically connected to the rectifier element 254, the auxiliary DC/DC converter 258 and the trigger circuit 252. The gate driver 258 is powered by a signal, e.g. Vaux, from the auxiliary DC/DC converter 258. The gate driver 258 outputs a signal to switch the FET 260 of the rectifier element 254. In particular, the gate driver 258 outputs a gate drive voltage or gate signal, Vgate, to control operation of the rectifier element 254, e.g. control switching of the FET 260 of the rectifier element 254.

The trigger circuit 252 is electrically connected to the rectifier element 254. The trigger circuit 252 is for is for synchronizing wireless power transfer. The trigger circuit 252 is further electrically connected to the receive element 229 and the input stage 250. To address the challenge of the non-negligible propagation delays from the gate driver 258 and the trigger circuit 252, the trigger circuit 252 is designed such that the trigger circuit 252 further delays the output signal Vtrig to ensure Vgate is synchronized with Vin.

The load 228 is electrically connected to the DC/DC converter 226. The load 228 receives the signal output by the DC/DC converter 226, Vout. The load 228 may be variable. As one of skill in the art will appreciate, the load 228 may be directly connected to the rectifier element 254 and received Vrect if DC conversion is not required.

While the receiver 220 has been described as comprising the input stage 250 and DC/DC converter 226, one of skill in the art will appreciate that other configurations are possible. In particular, the receiver 220 may not comprise either one or both of the input stage 250 and the DC/DC converter 226.

The gate signal, Vgate, controls operation of the current between the source and drain of the FET 260 thus controlling rectification of the input signal, Vin, received at the receive element 229. As the gate signal is in phase with the input signal, the FET 260 operates as a class E inverter. A class E inverter generally operates at high efficiency resulting in a high efficiency rectifier.

Figure 4:
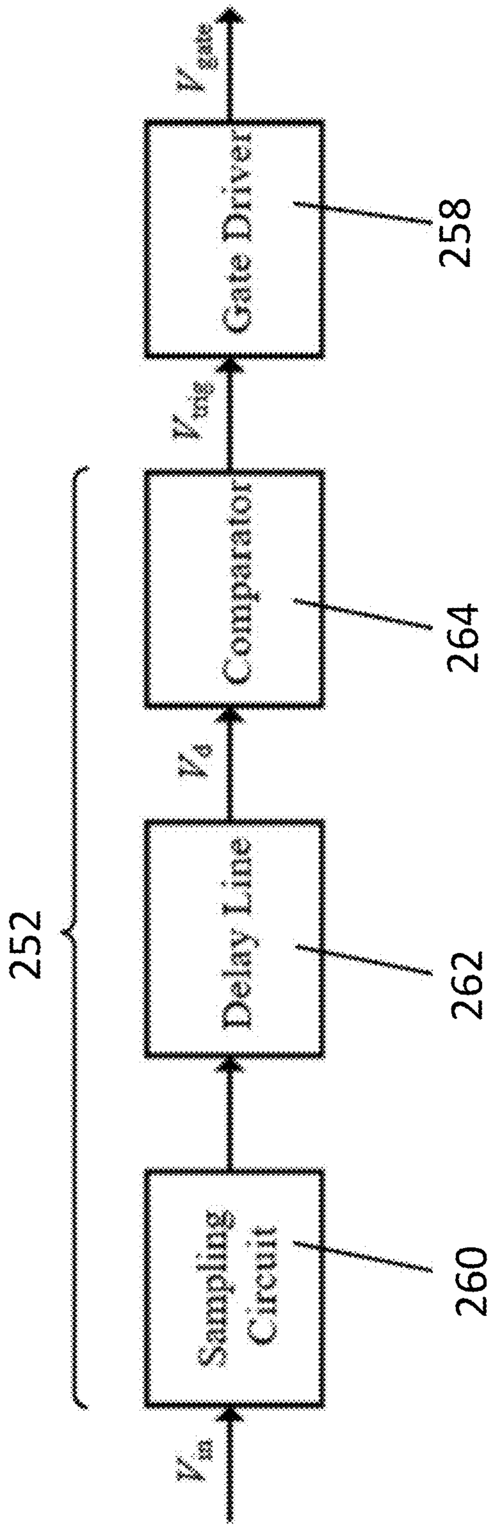
FIG. 4 is a block diagram of a portion of the circuitry of the receiver of FIG. 3.

Turning now to FIG. 4, a block diagram of a portion of the circuitry 224. Specifically, a block diagram of the trigger circuit 252 and gate driver 258 is shown. As shown in FIG. 4, the input voltage or signal Vin is sampled via a sampling circuit 260 and fed to a delay line 262. In this embodiment, the sampling circuit 260 is a voltage divider, and the delay line 262 is a lumped element delay line circuit. The output of the delay line 262 is fed to a comparator circuit 264. The comparator circuit 264 is for generating a clock signal by comparing the delayed signal (Vd) output by the delay line 262 to a DC level.

The resulting trigger voltage (Vtrig) is fed to the gate driver 258. The gate driver 258 converts the trigger voltage to a suitable waveform (Vgate) for driving the FET 260 of the rectifier element 254. Both the comparator circuit 264 and the gate driver 258 have propagation delays on the order of nanoseconds, which can be significant when dealing with switching periods of roughly 73.7 ns (for an operating frequency of 13.56 MHZ) or 36.9 ns (for an operating frequency 27.12 MHZ). The sampling circuit 260, delay line 262 and comparator circuit 264 form the trigger circuit 252. These elements are designed to ensure that Vgate is synchronized with Vin.

Figure 5:
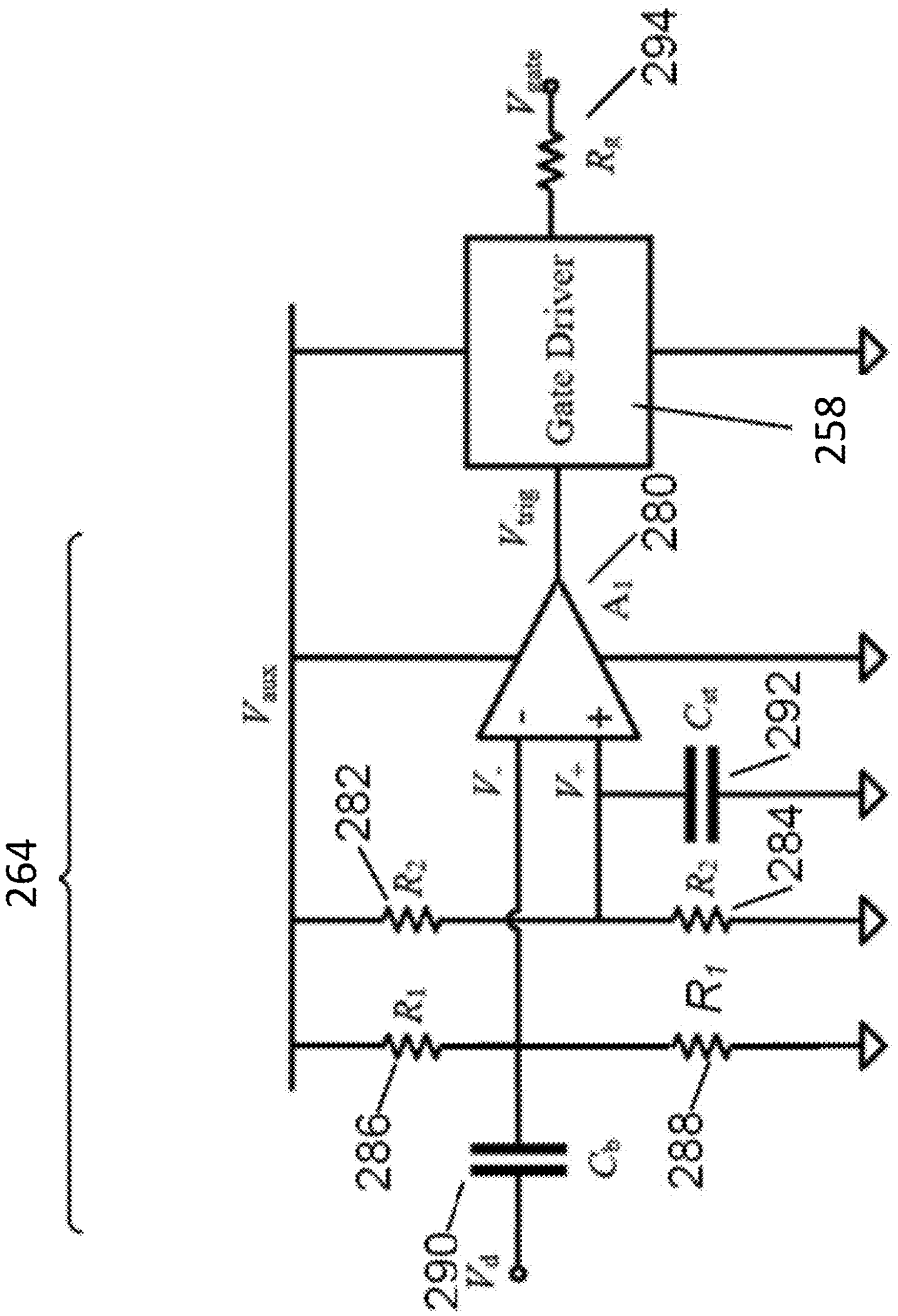
FIG. 5 is a schematic diagram of a portion of the circuitry of the receiver of FIG. 3.

Turning now to FIG. 5, a schematic diagram of another portion of the circuitry 224 is shown. The schematic diagram illustrates an exemplary arrangement of the comparator circuit 264 and the gate driver 258. As previously stated, the comparator circuit 264 is for generating a clock signal by comparing the delayed signal (Vd) output by the delay line 262 to a DC level.

As shown in FIG. 5, the comparator circuit 264 comprises a comparator 280 (A1) is powered from the auxiliary supply having an auxiliary supply voltage (Vaux). The inputs of the comparator 280 are biased to roughly half of Vaux. For the positive comparator input (V+) this is achieved using two equal-valued resistors 282, 284, each with resistance of R2. The negative comparator input (V−) this is achieved using two equal-valued resistors 286, 288, each with resistance of R1.

The delayed voltage signal (Vd) output by the delay line 262 is coupled to the negative comparator input (V−) via DC blocking capacitor 290 having a capacitance of (Cb) thus the trigger voltage (Vtrig) will be inverted (180° out-of-phase) relative to the delayed voltage signal (Vd). In terms of the total delay required to ensure that Vgate is in-phase with Vin, this effectively accounts for half of the switching period, thus reducing the burden on the delay line 262.

While the system 200 described may transfer power wirelessly, it may be desirable to send data from the receiver 220 to the transmitter 210. For example, it may be desirable to transmit data during the operation of the wireless power transfer system 200 to send relevant data, e.g., DC voltages, currents, temperatures, and battery charge, regarding the operating condition of the receiver 220. The data may then be used by the transmitter 210 for decision making in terms of authentication, protection, and operation of the system 200. Additionally, customer data may be transferred from receiver 220 to the transmitter 210 where it may then be transmitter to an end-user using a commonly used communication method such as Wi-Fi, Ethernet, Bluetooth, or USB.

To send data from the receiver to the transmitter in some wireless power transfer systems, a dummy load is introduced at the receiver to change the loading condition. The dummy lead, e.g., a resistor, is introduced in series via a switch connection at the output of a rectifier element of the receiver. By turning the switch ON and OFF, the loading condition of the system is changed and this change can be detected on the transmitter and demodulated in order to receive data from the receiver.

This method presents several disadvantages. For example, the baud rate, i.e., transfer rate, of data transferred from the receiver to the transmitter is limited by the values of the dummy load and the total DC capacitance at the output of the rectifier element. Using smaller dummy loads can increase the baud rate; however, it will increase the power dissipation in the dummy resistor resulting in component heating. Also, reducing the value of the capacitor at the output of the rectifier element, i.e., the input capacitor of the DC/DC converter of the receiver, can result in unstable operation of the wireless power transfer system.

Other wireless power transfer systems involve modulating a capacitor at the switch node of the rectifier element instead of a dummy resistive load at the rectifier element's output. This technique may be effective for passive rectifier elements, but for synchronous rectifier element, such as the circuitry 226 described, the off capacitance can detune the zero-voltage-switching (ZVS) of the rectifier element. Detuning of the ZVS may decrease efficiency of the rectifier element resulting in an overall decrease of the power transfer of the system.

Figure 6:
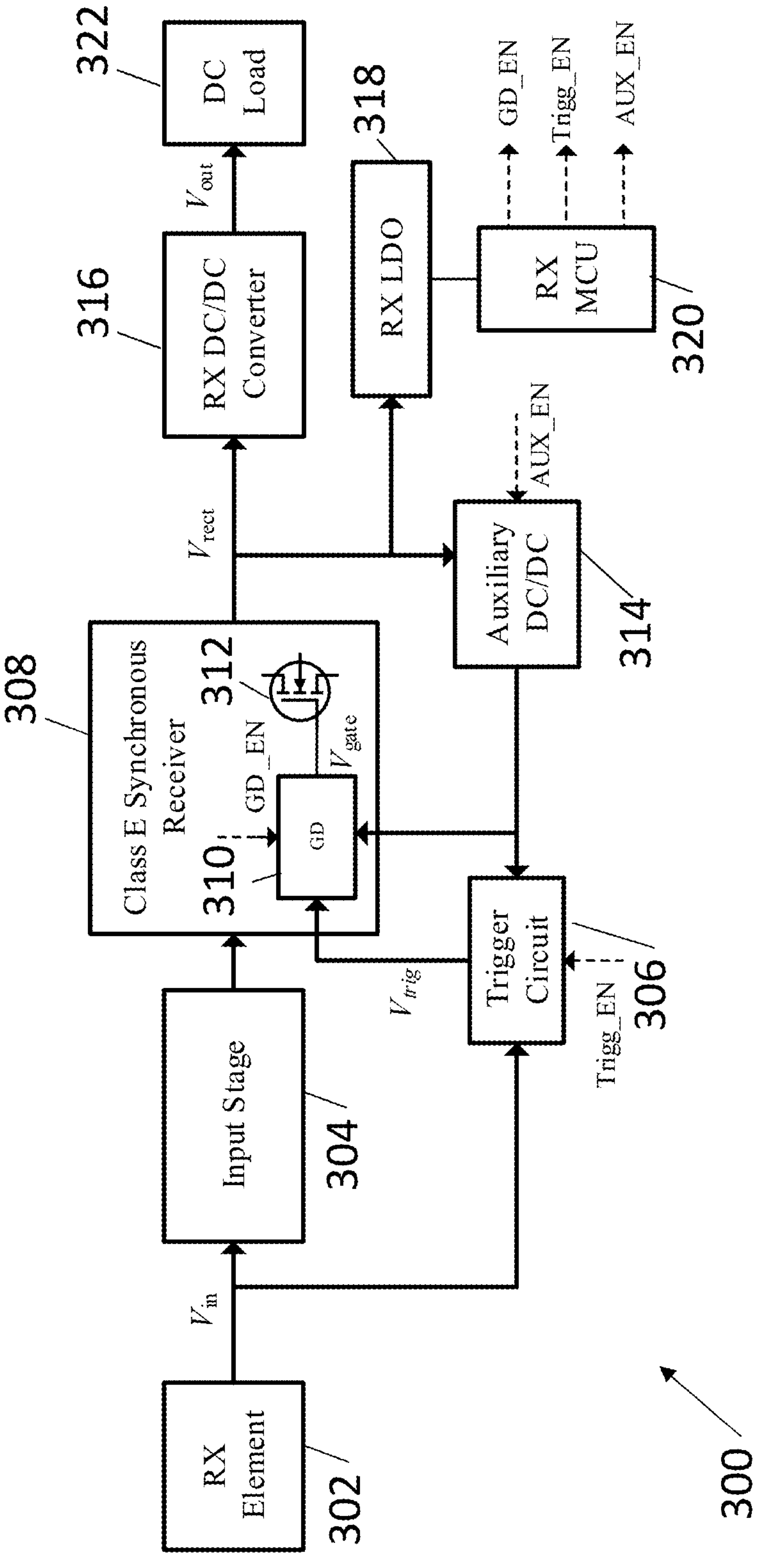
FIG. 6 is a block diagram of a receiver of a wireless power transfer system in accordance with an aspect of the disclosure.

According to the disclosure, there is provided a method and controller of communicating between a receiver of a wireless power transfer system and a transmitter of the wireless power transfer system, the receiver comprising a synchronous rectifier. Turning now to FIG. 6 a receiver 300 is illustrated in accordance with an aspect of this disclosure.

The receiver 300 comprises a receive element 302, input stage 304, trigger circuit 306, rectifier element 308 having gate driver 310 and FET 312, auxiliary DC/DC converter 314, DC/DC converter 316 (i.e., primary DC/DC converter), low-dropout (LDO) regulator 318, microcontroller 320 and load 322.

The receive element 302 is electrically connected to the input stage 304 and trigger circuit 306. The receive element 302 is the same as receive element 229 unless otherwise stated. The receive element 302 extracts wireless power from a field generated by a transmitter of a wireless power transfer system. The voltage extracted or received is represented by Vin.

The input stage 304 is electrically connected to the rectifier element 308, trigger circuit 306 and receive element 302. The input stage 304 is the same as input stage 250 unless otherwise stated.

The rectifier element 308 is electrically connected to the input stage 304, trigger circuit 306, auxiliary DC/DC converter 314, DC/DC converter 316, LDO regulator 318, and microcontroller 320. The rectifier element 308 is the same as the rectifier element 254 unless otherwise stated. In the illustrated arrangement, the gate driver 310 of rectifier element 308 is electrically connected to the microcontroller 320 such that the microcontroller 320 may control operation of the gate driver 310 as will be described.

The trigger circuit 306 is electrically connected to the rectifier element 308, input stage 304, receive element 302, auxiliary DC/DC converter 314 and microcontroller 320. The trigger circuit 306 is the same as the trigger circuit 252 unless otherwise stated. In the illustrated arrangement, the microcontroller 320 may control operation of the trigger circuit 306 as will be described.

The auxiliary DC/DC converter 314 is electrically connected to the trigger circuit 306, gate driver 310, LDO regulator 318, rectifier element 308, DC/DC converter 316 and microcontroller 320. The auxiliary DC/DC converter 258 is the same as the auxiliary DC/DC converter 258 unless otherwise stated. In the illustrated arrangement, the microcontroller 320 may control operation of the auxiliary DC/DC converter 314 as will be described.

The DC/DC converter 316 is electrically connected to the LDO regulator 318, auxiliary DC/DC converter 314 and rectifier element 308. The DC converter 316 is the same as the DC/DC converter 226 unless otherwise stated.

The load 322 is electrically connected to the DC/DC converter 316. The load 322 is the same as the load 228 unless otherwise stated.

The LDO regulator 318 is electrically connected to the DC/DC converter 316, rectifier element 308 and auxiliary DC/DC converter 314. The LDO regulator 318 is adapted to supply power to the microcontroller 320.

The microcontroller 320 is adapted to selectively modify operation of elements of the receiver 300. Specifically, the microcontroller 320 is adapted to modify operation of a synchronous rectifier, e.g., the rectifier element 308, trigger circuit 306 and auxiliary DC/DC converter 314, of the receiver 300. The microcontroller 320 is adapted to selectively enable and disable the synchronous rectifier to effect a parameter which is detectable at the transmitter. This parameter change may be detected and demodulated to determine data sent from the receiver 300 to a transmitter of a wireless power transfer which is transferring power to the receiver 300.

The microcontroller 320 receives input data for transmission to the transmitter. Alternatively, the microcontroller 320 may produce its own data for transmission to the transmitter. For example, the microcontroller 320 may include a timer. The microcontroller 320 may be adapted to transmit data, i.e., timer data, from the timer to the transmitter. As such, references to data transmitter to the transmitter may include data received by the microcontroller 320 for transmission, and/or data generated by the microcontroller 320 for transmission.

The microcontroller 320 is adapted to control operation of the rectifier element 308, trigger circuit 306 and auxiliary DC/DC converter 314 based on the input data. Specifically, the microcontroller 320 controls the amount of time the synchronous rectifier is enabled and disabled thereby encoding data for transmission.

In the illustrated arrangement, the microcontroller 320 comprises a number of outputs, e.g., general purpose input/outputs, which control operation of the auxiliary DC/DC converter 314 which provides power to the gate driver 310 and trigger circuit 306, a comparator, e.g., comparator circuit 264, of the trigger circuit 306, and the gate driver 310. One of skill in the art will appreciate, the microcontroller 320 may only be electrically to one of these components in order to toggle operation of the synchronous rectifier.

The microcontroller 320 is adapted to disable operation of any one of these components resulting in the synchronous rectifier being put into a no-load condition. Due to the junction capacitance of a diode in parallel with a main switch of a class E synchronous rectifier of the rectifier element 308, the presented impedance to the receive element 302 will be different and the duty cycle of the diode at the switch node of the rectifier element 308 is close to 100%. This results in sharp changes in the impedance seen by the receive element 302 and consequently by the transmitter wirelessly transferring power to the receiver 300. This sharp change in the output impedance of the transmitter results in instant changes in waveforms at the transmitter that can be decoded to determine data transmitted from the receiver 300 to the transmitter.

Figure 7:
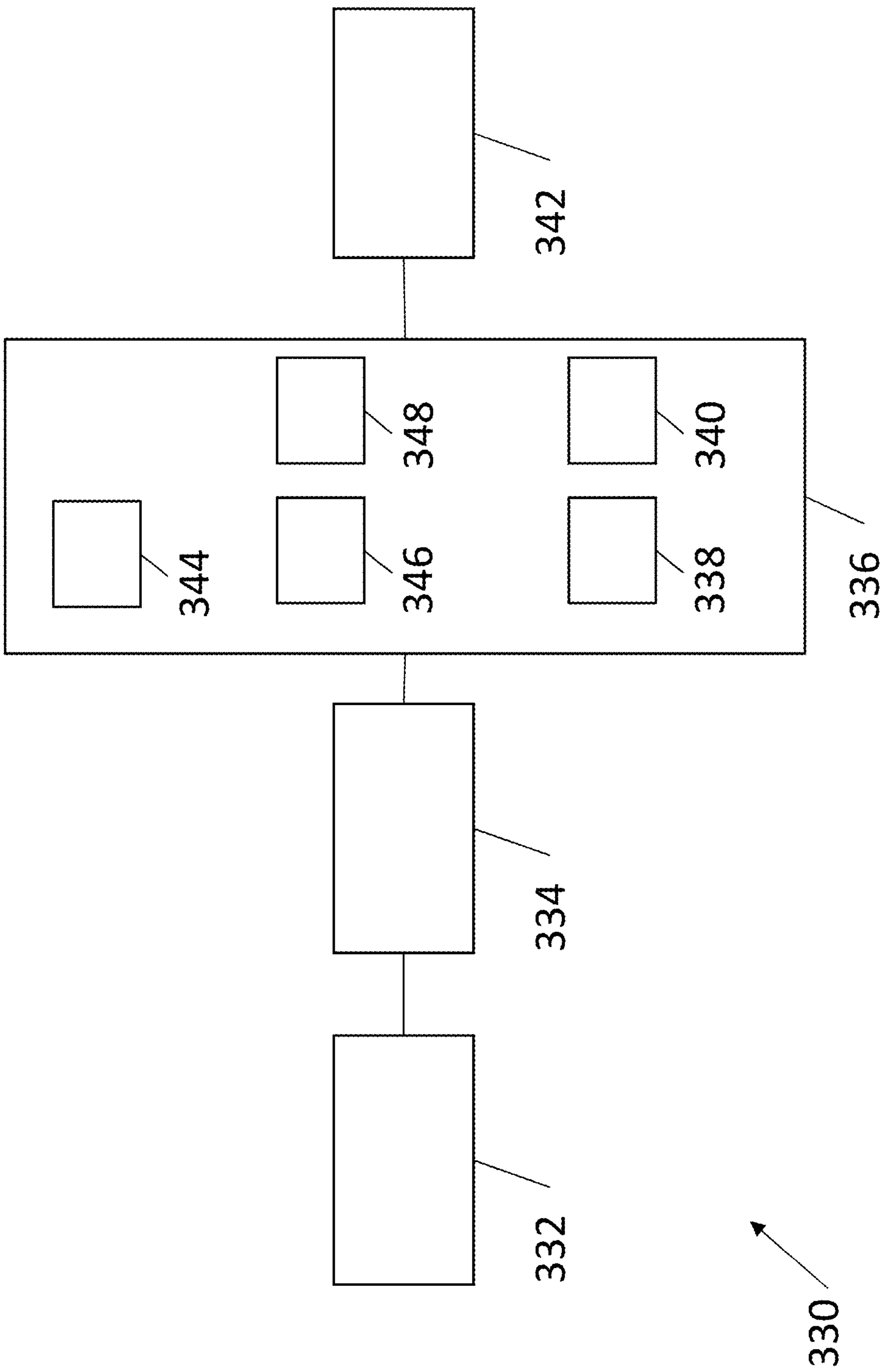
FIG. 7 is a block diagram of a transmitter of a wireless power transfer system in accordance with an aspect of the disclosure.

Turning now to FIG. 7, an embodiment of a transmitter 330 in accordance with an aspect of the disclosure is illustrated. The transmitter 330 is adapted for use with the described receiver 300.

The transmitter 330 comprises power supply 332, DC/DC converter 334, circuitry 336 comprising inverter 338 and output stage 340, and transmit element 342. The power supply 332 is electrically connected to the DC/DC converter 334. The power supply 332 is adapted to supply a power signal to the DC/DC converter 334. The power supply 332 is adapted to supply a DC power signal to the DC/DC converter 334.

The DC/DC converter 334, i.e., the primary DC/DC converter, is electrically connected to the power supply 332 and the circuitry 336. Specifically, the DC/DC converter 334 is electrically connected to the inverter 338 of the circuitry 336. The DC/DC converter 334 is adapted to convert a power signal received from the power supply 332 to a desired voltage level.

The circuitry 336 is electrically connected to the transmit element 342 and the DC/DC converter 334. Specifically, the inverter 338 is electrically connected to the DC/DC converter 334 and the output stage 340 is electrically connected to the transmit element 342. The inverter 338 is adapted to convert the converted DC power signal from the DC/DC converter 334 to an alternating current (AC) signal. The inverter 338 may comprise a high frequency power inverter. The output stage 340 is adapted to match the output impedance of the inverter 338 to the optimum impedance of the wireless power link between the transmit element 342 and a corresponding receive element, e.g., receive element 229. The output stage 340 is additionally or alternatively adapted to filter high frequency harmonic components of the inverter 338. The output stage is additionally or alternatively adapted to establish a quasi-current source behaviour at the connection point of the wireless link.

The transmit element 342 is electrically connected to the circuitry 336. Specifically, the transmit element 342 is electrically connected to the output stage 340. The transmit element 342 comprises one or more capacitive electrodes and inductive elements, i.e. inductors. The capacitive electrodes may be laterally spaced, elongate electrodes; however, one of skill in the art will appreciate that other configurations are possible including, but not limited to, concentric, coplanar, circular, elliptical, disc, etc., electrodes. Other suitable electrode configurations are described in applicant's U.S. Pat. No. 9,979,206B2, the relevant portions of which are incorporated herein by reference. The inductive elements may comprise one or more coils. The coils may include booster or shield coils such as described in applicant's U.S. patent application Ser. No. 17/193,539, the relevant portions of which are incorporated herein by reference. The transmit element 342 may generally correspond with the receive element, e.g., receive element 229, 302 to allow for wireless power transfer from the transmitter 330 to the receiver, e.g., receiver 220, 300.

In accordance with an aspect of the disclosure the circuitry 336 further comprises LDO regulator 344, microcontroller 346, and detector 348. The LDO regulator 344 is electrically connected to the DC/DC converter 344, inverter 336 and the microcontroller 346. The LDO regulator 344 is adapted to supply power to the microcontroller 346.

The microcontroller 346 is electrically connected to the LDO regulator 344 and the detector 348. The microcontroller 346 is adapted to decode data transmitted by a receiver to the transmitter 330 based on a parameter change detected by the detector 348. The microcontroller 346 may comprise a microcontroller.

The detector 348 is electrically connected to the output stage 340, or the DC/DC converter 334 and inverter 338. The detector is adapted to detect a change in a parameter at the transmitter 330 as will be described.

Figure 8:
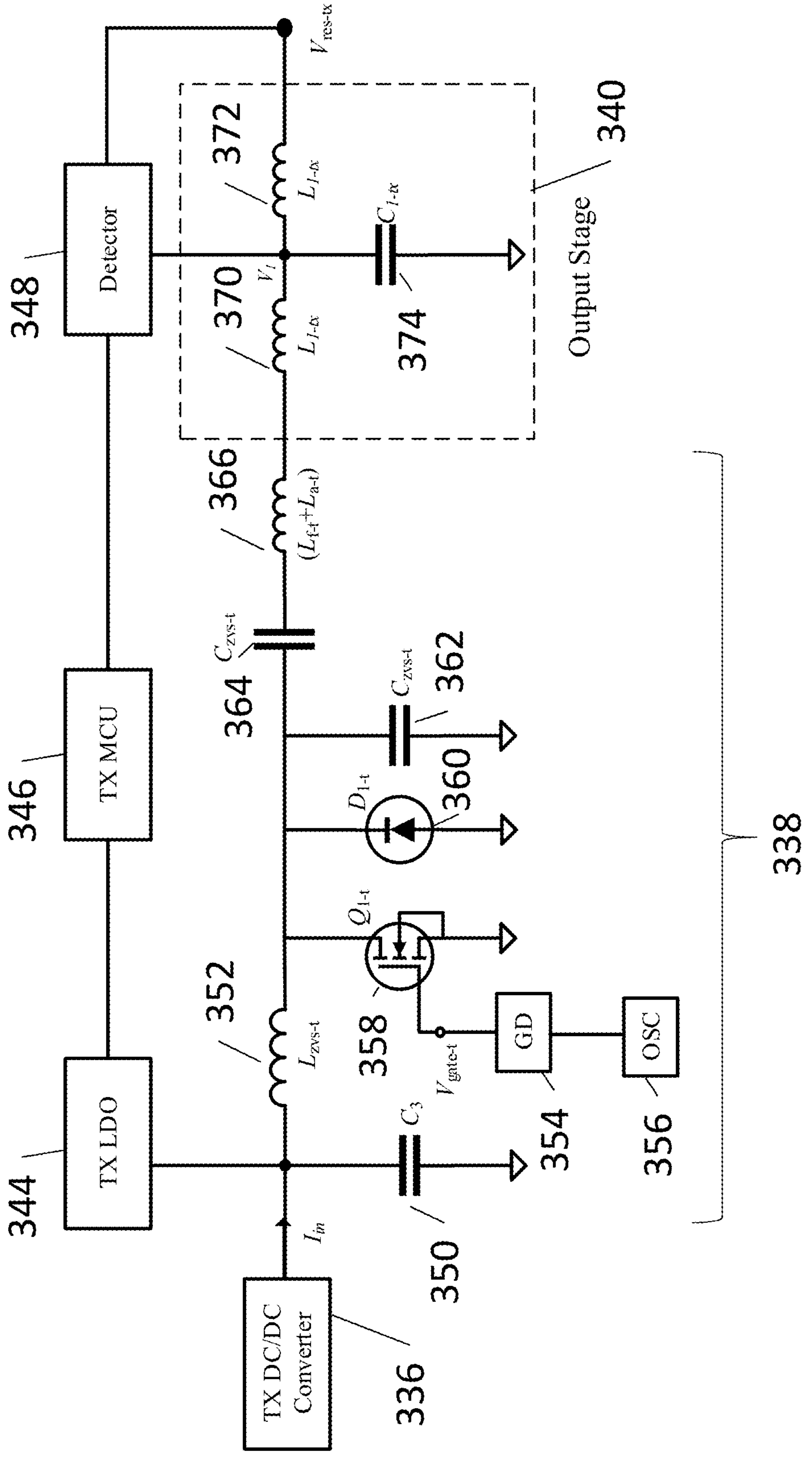
FIG. 8 is a schematic diagram of a portion of the transmitter of FIG. 7.

The microcontroller 346 and detector 348 shall be described in greater detail with reference to FIG. 8. Turning now to FIG. 8, a portion of an embodiment of the transmitter 330 is illustrated in greater detail. In the illustrated arrangement, the LDO regulator 344 is powered by the DC/DC converter 336 and powers the microcontroller 346. The microcontroller 346 receives a signal from the detector 348. The detector 348 outputs a logic level signal, i.e., logic levels, which the microcontroller 346 decodes into data transmitted by a receiver to the transmitter 330.

In the illustrated arrangement, the detector 348 detects a voltage waveform, i.e., the detector 348 is a voltage detector. The detector 348 detects a voltage waveform based on variations in voltage at two nodes, e.g., V1 at an intermediate point of the output stage 340 and Vres-tx at an output of the output stage 340. While the detector 348 is described as detecting a voltage waveform based on variations in voltage at two nodes, one of skill in the art will appreciate the detector 348 may be connected to only a single node. For example, the detector 348 may detect a voltage waveform based on variations in voltage Vres-tx at the output of the output stage 340.

In the illustrated arrangement, the inverter 338 comprises capacitor 350, inductor 352, gate driver 354, clock generator 356, main switch 358, diode 360, capacitor 362, capacitor 364, and inductor 366. The capacitor 350 having capacitance C3 is connected in parallel to the DC/DC converter 336, and in parallel to the inductor 352 having inductance LZVS-t. The capacitor 350 is connected in parallel to the main switch 358 indicated as Q1-t. In the illustrated arrangement, the main switch 358 comprises an n-type MOSFET. While an n-type MOSFET has been illustrated, one of skill in the art will appreciate other FETs and switching devices may be used.

The main switch 358 is electrically connected to the gate driver 354 which is electrically connected to the clock generator 356. The gate driver 354 drives the main switch 358 of the inverter 338. The clock generator 356 is electrically connected to the gate driver 354. The clock generator 356 comprises an oscillator. One of skill in the art will appreciate the clock generator 356 may comprise any signal generator.

The clock generator 356 is configured to generate a clock signal to control the gate driver 354 connected to the main switch 358 to invert the inputted power signal from the power source 332 (via the DC/DC converter 334) to an RF or AC signal.

The inverter 338 further comprises a diode 360 indicated as D1-t electrically connected in parallel to the main switch 358, and the capacitor 362 having a capacitance CZVS-t electrically connected in parallel to the diode 360. The capacitor 362 is electrically connected to the capacitor 364 having a capacitance CZVS-t which is electrically connected in series to the inductor 366 having the inductance Lf-t+La-t. The main switch 358, diode 360 and capacitor 362 are connected in parallel between inductor 352 and capacitor 364.

In the illustrated arrangement, the output stage 340 comprises inductor 370 having inductance L1-tx electrically connected in series to inductor 372 having inductance L1-tx with capacitor 374 having capacitance C1-tx electrically connected in parallel between the inductors 370, 372.

As described, the detector 348 detects a voltage waveform based on variations in voltage at at least one of two nodes, e.g., V1 at an intermediate point of the output stage 340 and Vres-tx at an output of the output stage 340. The detector 348 outputs a logic level signal, i.e., logic levels, which the microcontroller 346 decodes into data transmitted by a receiver to the transmitter 330.

Figure 9:
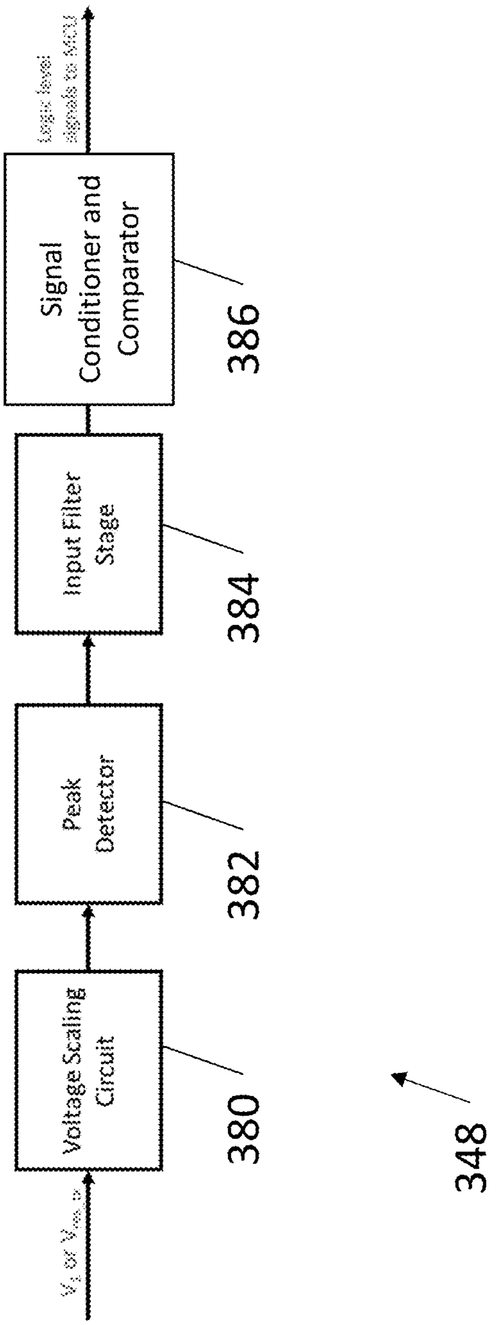
FIG. 9 is a block diagram of a detector of the transmitter of FIG. 7.

Turning now to FIG. 9, the detector 348 is illustrated in greater detail. The detector 348 demodulates the voltage waveform detected at the transmitter. In other words, the detector 348 comprises a voltage demodulator. The detector 348 comprises scaling circuit 380, peak detector 382, filter 384, and signal conditioner and comparator 386.

In operation, the scaling circuit 380 receives the detected waveforms, e.g., V1 and Vres-tx. The scaling circuit 380 reduces an amplitude of the detected waveforms in order to more easily process the waveforms. The amplitude reduced waveforms are then fed to the peak detector 382 which converts the signals into a DC voltage. When a sudden change in the RF signal input to the peak detector 382 occurs as a result of the receiver toggling operation of the synchronous rectifier, the signal output from the peak detector 382 changes in proportion. The filter 384, i.e., input filter stage, filters this output. For example, the filter 384 filters this change while blocking unwanted signal components such as high frequency noise and DC offset. The filtered signal then passes through the signal conditioner and comparator 386. The signal conditioner and comparator 386 amplifies and then compares the amplified against a reference level. The signal conditioner and comparator 386 may comprises a comparator. The signal conditioner and comparator 386 outputs a logic level signal whenever a sufficiently large modulation in the RF input voltage signals occurs.

The output logic level signal is then provided to the microcontroller 346 for decoding. The microcontroller 346 determines time between the modulated pulses to decode/demodulate the logic level signal in a binary sequence representing data transmitter from a receiver to the transmitter 330.

This is similar to the process undertaken at the receive microcontroller 320 which receives or generate data for transmission to the transmitter, e.g., transmitter 330. Similar to transmit microcontroller 346, receive microcontroller 320 encodes the data to be transmitted into a time sequence of synchronous and non-synchronous operation of the synchronous rectifier which results in the change in the waveform detected at the transmitter.

Figure 10:
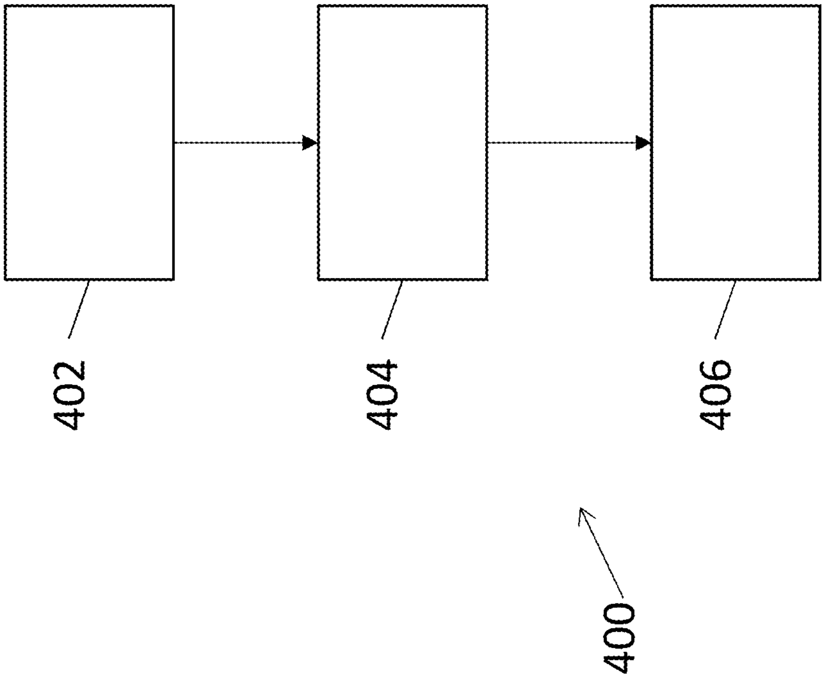
FIG. 10 is a flowchart of a method of communicating between a receiver and a transmitter of a wireless power transfer system in accordance with an aspect of the disclosure.

Turning now to FIG. 10, a flowchart illustrated a method 400 of communicating between a receiver, e.g., receiver 300, and a transmitter, e.g., transmitter 330, is illustrated. The method 400 comprises modifying 402 operation of a synchronous rectifier of a receiver. For example, modifying 402 operation may comprise selectively enabling and/or disabling operation of the gate driver 310, trigger circuit 306 and/or auxiliary DC/DC converter 314. Such selective toggling of components of the synchronous rectifier is performed according to data to be transmitted such that the resulting parameter change at the transmitter 330 is indicative of the data to be communicated from the receiver 300 to the transmitter 330.

Toggling the synchronous rectifier between synchronous and non-synchronous operation by selectively enabling and/or disabling operation of the gate driver 310, trigger circuit 306 and/or auxiliary DC/DC converter 314 is performed according to the time sequence generated based the receive microcontroller 320 based on data to be transmitted. In this way, data, e.g., binary data, is converted from a binary sequence to a time sequence of toggling operation. As such, the method 400 may include a step of encoding data to be transmitted into a time sequence of modifying operation of the synchronous rectifier prior to the modifying 402 step.

The method 400 further comprises detecting 404 a parameter change at the transmitter 330 based on a modification of the operation of the synchronous rectifier. As described the detector 348 detects voltage waveforms at the transmitter 330 based on the modification of the operation of the synchronous rectifier.

The method 400 further comprises determining 406 data communicated from the receiver 300 to the transmitter 330 based on the parameter change, i.e., the detected parameter change. As described the detector 348 processes the detected waveforms and compares the processed waveforms with levels to produce a logic level signal which is decoded into data transmitted from the receiver 300 to the transmitter 330.

Such a method of communicating data may be more efficient than existing methods while allowing for higher data transfer rates. Further such a method may be operational with a receiver comprising a synchronous rectifier by selectively toggling operation of the synchronous rectifier to communicate data to a transmitter from which the receiver is extracting power.

An experimental setup of the receiver 300 and transmitter 330 was tested to assess performance. To emulate the presence of a fixed coupling wireless link between the transmitter 330 and receiver 300, an equivalent T-network was used to connect the transmitter 330 and receiver 300 in the experimental setup. In order to toggle the receiver 300 between synchronous and non-synchronous operation a function generator was used enable/disable the auxiliary DC/DC converter 314 of the receiver 300 which powers the synchronous rectifier's gate driver 310. All tests were carried under no-load at the receiver 300. Operation of the receiver 300 and transmitter 330 may be conducted under loading conditions at the receiver 300. The experimental setup transferred power from the transmitter 330 to the receive 300 using primarily magnetic field coupling. Further, the experimental setup had an operating frequency of 13.56 MHz.

Figure 11:
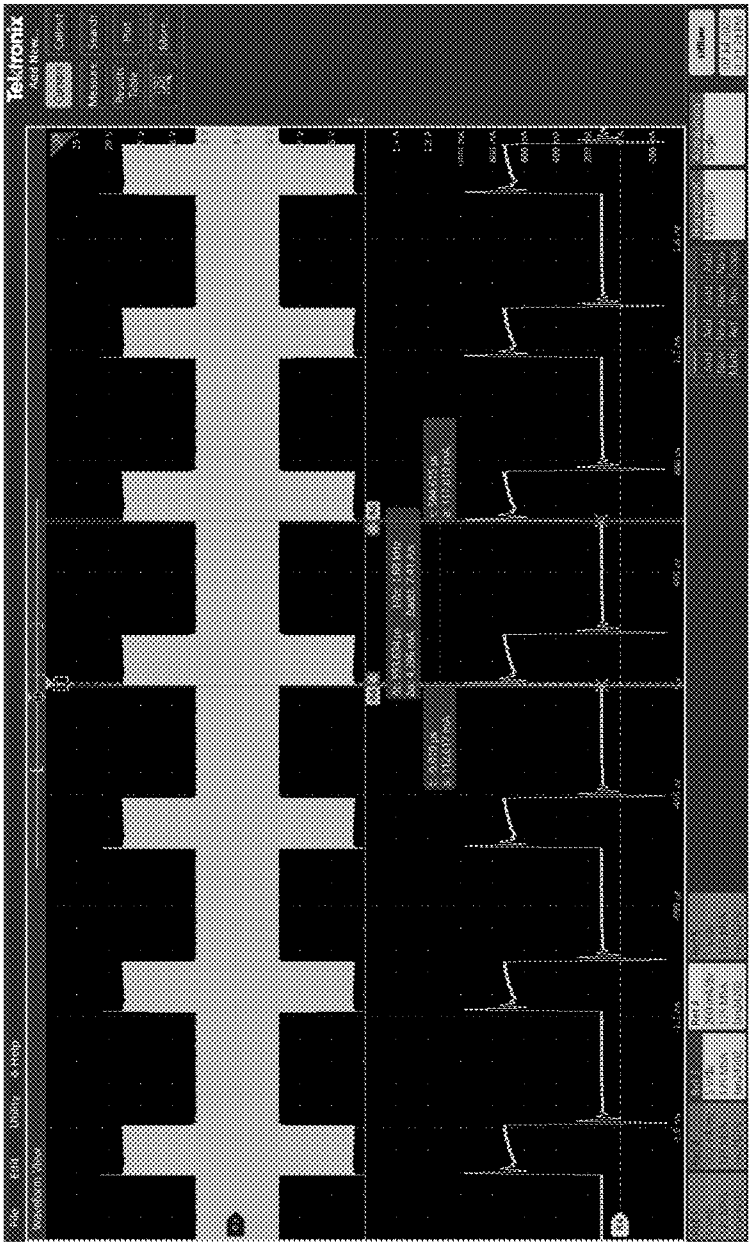
FIG. 11 is a graph of voltage and current waveforms of a transmitter in accordance with an aspect of the disclosure.

The transmitter RF voltage V1 as well as the transmitter current Iin were measured while the synchronous rectifier was modulated between synchronous and non-synchronous operation. The results of this testing are illustrated in FIGS. 11 to 15. FIG. 11 is a graph of voltage and current waveforms of the transmitter 330.

FIG. 11 illustrates the response of these voltage and current waveforms when the receiver 300 was modulated at a frequency of 1700 Hz. As illustrated, the voltage waveforms range from +18 V to −18 V with peaks at +18 V and −18 V, and trough at +6 V and −6 V. The current waveforms range from almost 1000 mA to a stead state of approximately 112-117 mA.

Figure 12:
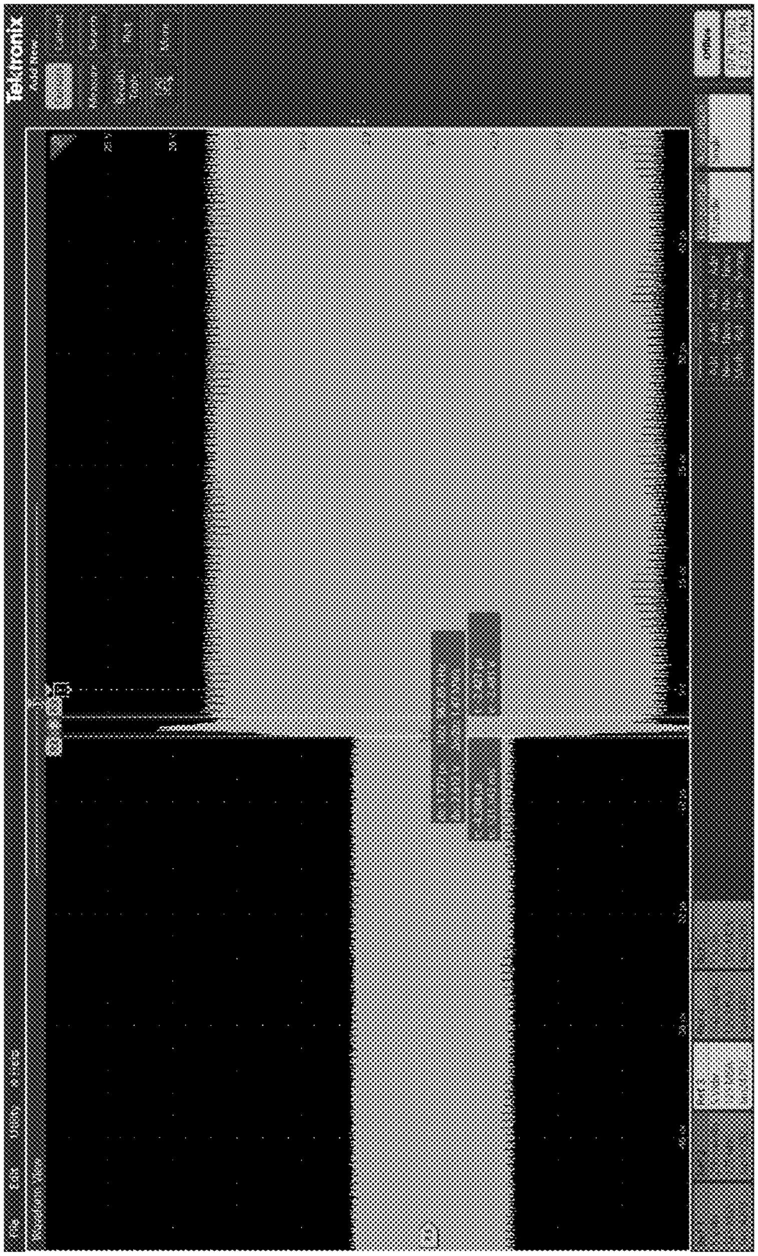
FIG. 12 is a graph of voltage rise time of a transmitter in accordance with an aspect of the disclosure.

FIG. 12 is a graph of voltage rise time of the transmitter 330 for an exemplary period of the voltage waveform. As illustrated in FIG. 12, during the rise time of 1.777 us the waveform exhibits a sharp increase in voltage of 2.612 V.

Figure 13:
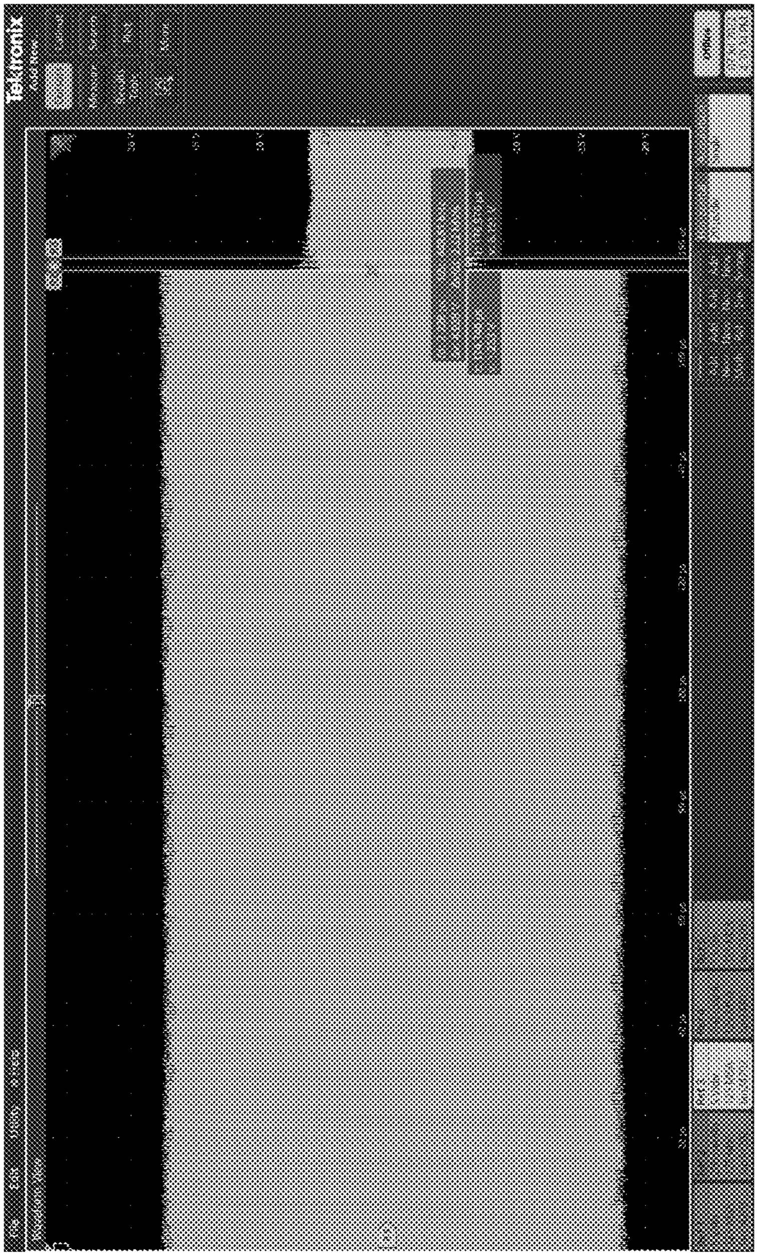
FIG. 13 is a graph of voltage fall time of a transmitter in accordance with an aspect of the disclosure.

FIG. 13 is a graph of voltage fall time of the transmitter 330 for an exemplary period of the voltage waveform. As illustrated in FIG. 13, during the fall time of 2.228 us the waveform exhibits a sharp decrease in voltage of 4.939 V.

Figure 14:
FIG. 14 is a graph of current rise time of a transmitter in accordance with an aspect of the disclosure.

FIG. 14 is a graph of current rise time of the transmitter 330 for an exemplary period of the current waveform. As illustrated in FIG. 14, during the rise time of 31.247 us the waveform exhibits an increase in current of 548.984 mA.

Figure 15:
FIG. 15 is a graph of current fall time of a transmitter in accordance with an aspect of the disclosure.

FIG. 15 is a graph of current fall time of the transmitter 330 for an exemplary period of the current waveform. As illustrated in FIG. 15, during the fall time of 46.633 μs the waveform exhibits a sharp decrease in current of 612.376 mA.

These graphs illustrate that changes in the voltage and current waveforms are detectable based on changes in operation of the synchronous rectifier in order to communicate data from the receiver to the transmitter.

Figure 16:
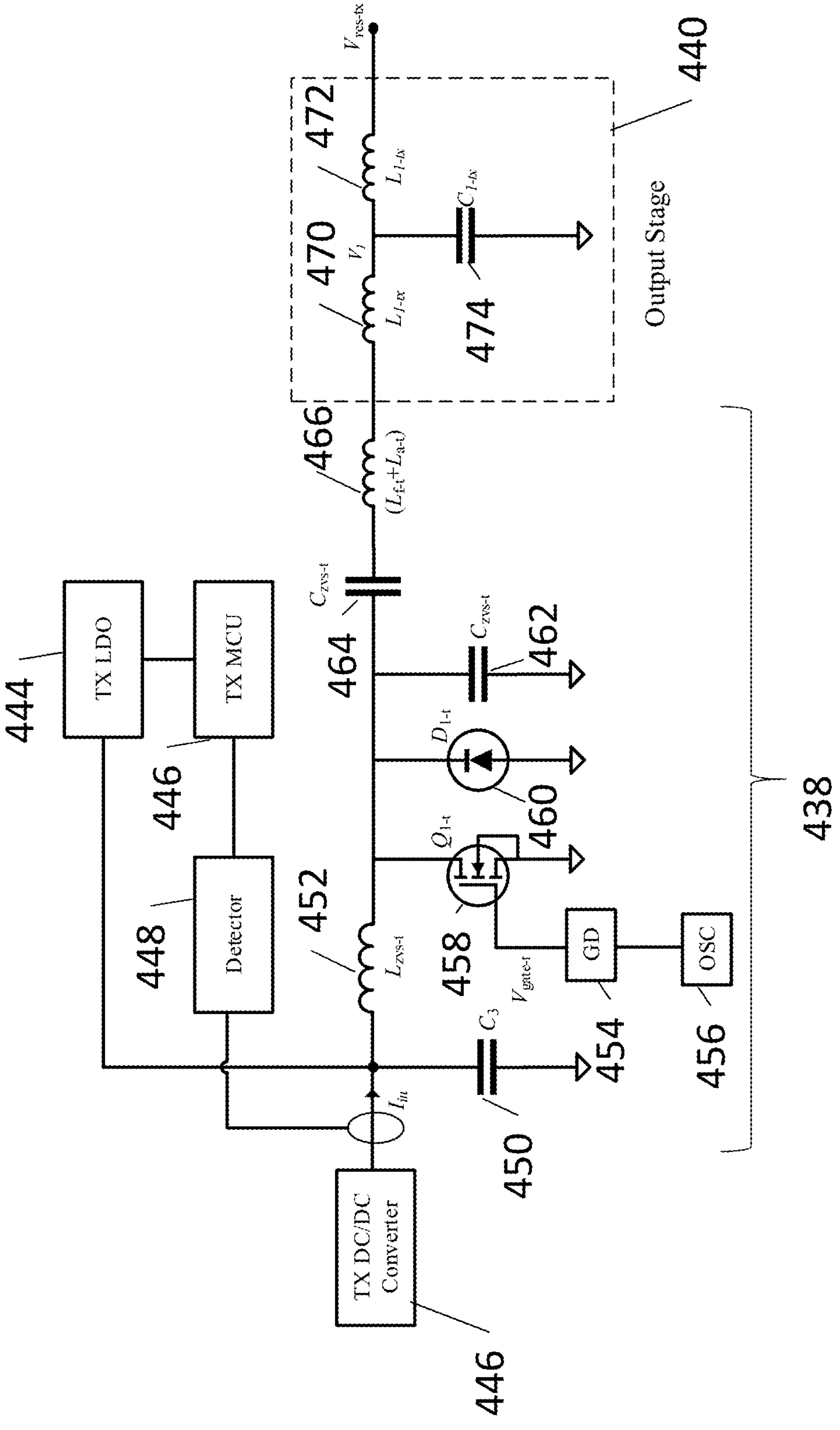
FIG. 16 is a schematic diagram of a portion of a transmitter in accordance with an aspect of the disclosure.

While a particular transmitter 330 is described, one of skill in the art will appreciate that other configurations are possible. Turning now to FIG. 16 another embodiment of a portion of a transmitter is illustrated. In this embodiment, the transmitter comprises like components of transmitter 330 with identical elements having reference symbols incremented by 100. The LDO regulator 444 is powered by the DC/DC converter 446 and powers the controller 46. The controller 446 receives a signal from the detector 448. The detector 448 outputs a logic level signal, i.e., logic levels, which the controller 446 decodes into data transmitted by a receiver to the transmitter.

In the illustrated arrangement, the detector 448 detects one or more current waveforms, i.e., the detector 448 is a current detector. The detector 448 detects a current waveform based on variations in current at a single node, e.g., Iin at an output of the DC/DC converter 446.

Since the input DC current of the transmitter changes according to the seen impedance, this signal, i.e., Iin, may alternatively or additionally be used as the source to a detector 448, e.g., current demodulator, which filters the detected DC current and generates logic-level message to reflect the variation in the DC current level of the transmitter. This signal is then transferred to the controller 446, e.g., microcontroller.

Figure 17:
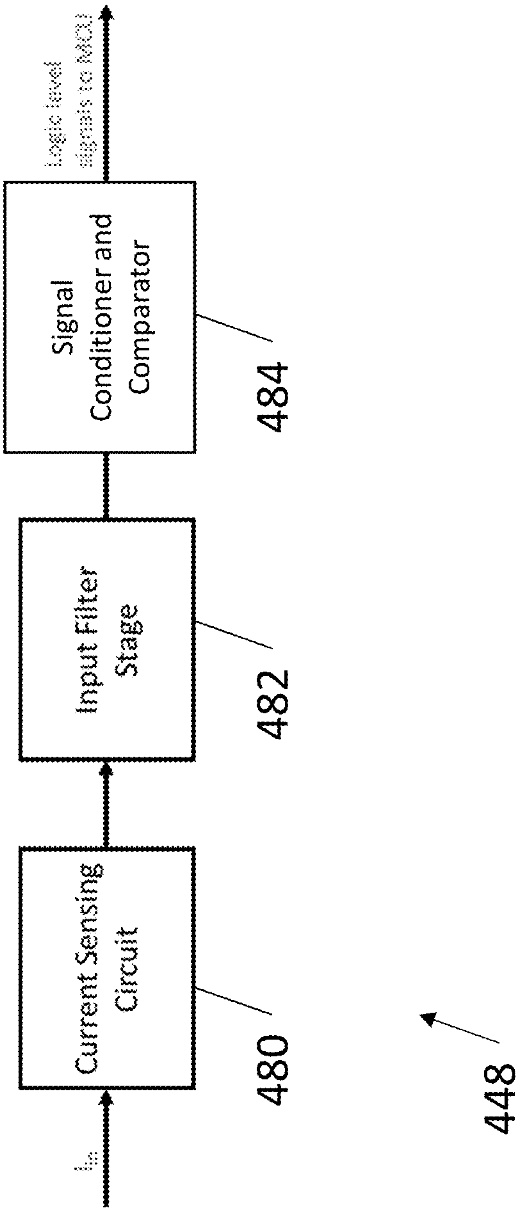
FIG. 17 is a block diagram of a current demodulator of the transmitter of FIG. 16.

Turning now to FIG. 17, the detector 448, i.e., current detector, is illustrated in greater detail. The detector 448 demodulates the current waveform detected at the transmitter as will be described. In other words, the detector 448 comprises a current demodulator. The detector 448 comprises current sensing circuit 480, filter 482, and signal conditioner and comparator 484.

In operation, the current sensing circuit 480 detects the current signal, e.g., input current Iin. The current sensing circuit 480 additionally scales the sensed current to a smaller amplitude. The current sensing circuit 480 additionally converts the sensed current, e.g., the scaled sensed current, into a voltage signal proportional to the sensed current. The filter 428, i.e., input filter stage, filters this output, i.e., the converted voltage. For example, the filter 428 filters this change while blocking unwanted signal components such as high frequency noise and DC offset. The filtered signal then passes through the signal conditioner and comparator 484. The signal conditioner and comparator 484 amplifies and then compares the amplified against a reference level. The signal conditioner and comparator 484 may comprises a comparator. The signal conditioner and comparator 484 outputs a logic level signal whenever a sufficiently large modulation in the input current Iin signal occurs.

The output logic level signal is then provided to the controller 446 for decoding. The controller 446 determines time between the modulated pulses to decode the logic level signal in a binary sequence representing data transmitter from a receiver to the transmitter.

It should be understood that the examples provided are merely exemplary of the present disclosure, and that various modifications may be made thereto.

What is claimed is:

1. A method of communicating between a receiver of a wireless power transfer system and a transmitter of the wireless power transfer system, the receiver comprising a synchronous rectifier, the method comprising:

modifying operation of a synchronous rectifier of a receiver of a wireless power transfer system, the synchronous rectifier comprising a trigger circuit, a gate driver electrically connected to the trigger circuit and a rectifier element, the gate driver controlling operation of the rectifier element via a trigger signal output by the trigger circuit, and an auxiliary DC/DC converter for powering the trigger circuit and the gate driver, wherein the modifying comprises selectively disabling output from the auxiliary DC/DC converter to remove power from the gate driver such that the synchronous rectifier transitions between class E synchronous operation and diode only rectification, producing a step change in effective load impedance;

detecting a parameter change at a transmitter of the wireless power transfer system based on a modification of the operation of the synchronous rectifier; and determining data communicated from the receiver to the transmitter based on the parameter change.

2. The method of claim 1, wherein modifying operation of the synchronous rectifier comprises:

toggling the synchronous rectifier between synchronous operation and non-synchronous operation.

3. The method of claim 1, wherein modifying operation of the synchronous rectifier comprises:

selectively enabling and disabling the synchronous rectifier.

4. The method of claim 1, wherein the synchronous rectifier comprises:

the rectifier element for rectifying a power signal to direct current (DC).

5. The method of claim 4, wherein modifying operation of the synchronous rectifier comprises:

controlling operation of at least one of the trigger circuit, and gate driver.

6. The method of claim 5, wherein controlling operation of at least one of the trigger circuit and gate driver comprises at least one of:

controlling operation of a comparator of the trigger circuit.

7. The method of claim 1, wherein detecting the parameter change comprises detecting a voltage or current waveform at the transmitter; and wherein determining data communicated comprises processing the detected voltage or current waveform to determine communicated data.

8. The method of claim 7, wherein processing the detected voltage or current waveform comprises:

filtering the voltage or current waveform;

generating logic levels based on the filtered voltage or current waveform; and decoding data based on the generated logic levels, wherein decoding data comprises:

determining time intervals between the logic levels; and decoding data based on the time intervals.

9. A method of communicating between a receiver of a wireless power transfer system and a transmitter of the wireless power transfer system, the receiver comprising a synchronous rectifier, the method performed by the receiver comprising:

modifying operation of the synchronous rectifier of the receiver of the wireless power transfer system based on input data to change a parameter at the transmitter, the synchronous rectifier comprising a trigger circuit, a gate driver electrically connected to the trigger circuit and a rectifier element, the gate driver controlling operation of the rectifier element via a trigger signal output by the trigger circuit, and an auxiliary DC/DC converter for powering the trigger circuit and the gate driver, wherein the modifying comprises selectively disabling output from the auxiliary DC/DC converter to remove power from the gate driver such that the synchronous rectifier transitions between class E synchronous operation and diode only rectification, producing a step change in effective load impedance.

10. The method of claim 9, wherein modifying operation comprises:

enabling and disabling synchronous operation of the synchronous rectifier based on the input data.

11. A controller for communicating a signal between a receiver of a wireless power transfer system and a transmitter of the wireless power transfer system, the receiver comprising a synchronous rectifier, the controller adapted to modify operation of the synchronous rectifier to alter a parameter detectable at the transmitter, the synchronous rectifier comprising a trigger circuit, a gate driver electrically connected to the trigger circuit and a rectifier element, the gate driver controlling operation of the rectifier element via a trigger signal output by the trigger circuit, and an auxiliary DC/DC converter for powering the trigger circuit and the gate driver, the controller further configured to modify operation by selectively disabling output from the auxiliary DC/DC converter to remove power from the gate driver such that the synchronous rectifier transitions between class E synchronous operation and diode only rectification, producing a step change in effective load impedance.

12. The controller of claim 11, the controller adapted to selectively enable and disable the synchronous rectifier.

13. The controller of claim 11, wherein the controller is electrically connected to at least one of:

the trigger circuit of the synchronous rectifier; and the gate driver of the synchronous rectifier, the gate driver electrically connected to the trigger circuit and the rectifier element of the synchronous rectifier; and the auxiliary DC/DC converter of the synchronous rectifier.

14. The controller of claim 13, the controller adapted to:

control operation of a comparator of the trigger circuit.

15. A method of communicating between a receiver of a wireless power transfer system and a transmitter of the wireless power transfer system, the receiver comprising a synchronous rectifier comprising a trigger circuit, a gate driver electrically connected to the trigger circuit and a rectifier element, the gate driver controlling operation of the rectifier element via a trigger signal output by the trigger circuit, and an auxiliary DC/DC converter for powering the trigger circuit and the gate driver, the method performed by the transmitter comprising:

detecting a parameter change at the transmitter based on a selective disabling of output from the auxiliary DC/DC converter to remove power from the gate driver such that the synchronous rectifier transitions between class E synchronous operation and diode only rectification, producing a step change in effective load impedance; and determining data communicated from the receiver to the transmitter based on the parameter change.

16. The method of claim 15, wherein detecting the parameter change comprises:

detecting a voltage or current waveform at the transmitter.

17. The method of claim 15, wherein determining data communicated comprises:

processing the detected voltage or current waveform to determine communicated data, wherein processing the detected voltage or current waveform comprises:

filtering the voltage or current waveform;

generating logic levels based on the filtered voltage or current waveform; and decoding data based on the generated logic levels.

18. A controller for communicating a signal between a receiver of a wireless power transfer system and a transmitter of the wireless power transfer system, the receiver comprising a synchronous rectifier comprising a trigger circuit, a gate driver electrically connected to the trigger circuit and a rectifier element, the gate driver controlling operation of the rectifier element via a trigger signal output by the trigger circuit, and an auxiliary DC/DC converter for powering the trigger circuit and the gate driver, the controller adapted to detect a parameter change at the transmitter based on selective disabling of output from the auxiliary DC/DC converter to remove power from the gate driver such that the synchronous rectifier transitions between class E synchronous operation and diode only rectification, producing a step change in effective load impedance.

19. The controller of claim 18, further adapted to determine data communicated from the receiver to the transmitter based on the parameter change.

20. The controller of claim 18, further comprising:

a detector for detecting a voltage and/or current waveform at the transmitter, wherein the detector comprises at least one of:

a demodulator adapted to demodulate a voltage and/or current waveform at the transmitter; and a filter adapted to filter the demodulated voltage and/or current.

* * * * *